US008026158B2

(12) United States Patent
Bruland et al.

(10) Patent No.: US 8,026,158 B2
(45) Date of Patent: Sep. 27, 2011

(54) SYSTEMS AND METHODS FOR PROCESSING SEMICONDUCTOR STRUCTURES USING LASER PULSES LATERALLY DISTRIBUTED IN A SCANNING WINDOW

(75) Inventors: Kelly J. Bruland, Portland, OR (US); Mark A. Unrath, Portland, OR (US); Douglas E. Holmgren, Portland, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 804 days.

(21) Appl. No.: 11/757,232

(22) Filed: Jun. 1, 2007

(65) Prior Publication Data
US 2008/0299783 A1 Dec. 4, 2008

(51) Int. Cl.
H01L 21/20 (2006.01)
H01L 21/36 (2006.01)

(52) U.S. Cl. ........ 438/487; 438/128; 438/166; 438/795; 438/530; 257/E21.596; 219/121.68; 219/121.67; 219/121.85; 219/121.6

(58) Field of Classification Search .................. 438/487
See application file for complete search history.

(56) References Cited

U.S. PATENT DOCUMENTS

| 4,678,889 | A | 7/1987 | Yamanaka |
| 5,595,583 | A | 1/1997 | Murnick |
| 5,837,962 | A | 11/1998 | Overbeck |
| 5,936,764 | A | 8/1999 | Kobayashi |
| 5,939,704 | A | 8/1999 | Perrie et al. |
| 5,969,851 | A | 10/1999 | Clark et al. |
| 6,031,852 | A | 2/2000 | Thompson et al. |
| 6,144,118 | A | 11/2000 | Cahill et al. |
| 6,495,791 | B2 | 12/2002 | Hunter et al. |
| 6,541,731 | B2* | 4/2003 | Mead et al. ............... 219/121.7 |
| 6,573,014 | B2* | 6/2003 | Yamaguchi et al. ........... 430/30 |
| 6,662,063 | B2 | 12/2003 | Hunter et al. |
| 6,744,228 | B1 | 6/2004 | Cahill et al. |
| 6,751,009 | B2 | 6/2004 | Khoshnevisan et al. |
| 6,815,693 | B2* | 11/2004 | Kamijo et al. ............ 250/491.1 |
| 6,816,294 | B2* | 11/2004 | Unrath et al. ............. 359/225.1 |
| 6,949,844 | B2 | 9/2005 | Cahill et al. |
| 6,972,268 | B2 | 12/2005 | Ehrmann et al. |
| 7,019,891 | B2 | 3/2006 | Johnson |

(Continued)

FOREIGN PATENT DOCUMENTS
JP 01224189 9/1989

OTHER PUBLICATIONS

Jul. 28, 2008, International Search Report and Written Opinion for PCT/US2008/057366, international filed Mar. 18, 2008.

(Continued)

Primary Examiner — Charles Garber
Assistant Examiner — Pape Sene
(74) Attorney, Agent, or Firm — Stoel Rives LLP

(57) ABSTRACT

Systems and methods process structures on or within a semiconductor substrate using a series of laser pulses. In one embodiment, a deflector is configured to selectively deflect the laser pulses within a processing window. The processing window is scanned over the semiconductor substrate such that a plurality of laterally spaced rows of structures simultaneously pass through the processing window. As the processing window is scanned, the deflector selectively deflects the series of laser pulses among the laterally spaced rows within the processing window. Thus, multiple rows of structures may be processed in a single scan.

17 Claims, 13 Drawing Sheets

U.S. PATENT DOCUMENTS

| | | | |
|---|---|---|---|
| 7,027,199 B2 | 4/2006 | Johnson | |
| 7,169,687 B2 * | 1/2007 | Li et al. | 438/463 |
| 7,197,208 B2 | 3/2007 | Trutna, Jr. et al. | |
| 7,245,412 B2 | 7/2007 | Bruland et al. | |
| 7,425,471 B2 * | 9/2008 | Bruland et al. | 438/130 |
| 7,435,927 B2 * | 10/2008 | Bruland et al. | 219/121.69 |
| 7,473,657 B2 * | 1/2009 | Okumura | 438/795 |
| 7,482,551 B2 * | 1/2009 | Sun et al. | 219/121.6 |
| 2002/0117481 A1 | 8/2002 | Unrath et al. | |
| 2002/0141473 A1 * | 10/2002 | Cordingley et al. | 372/106 |
| 2002/0162973 A1 | 11/2002 | Cordingley et al. | |
| 2002/0167581 A1 | 11/2002 | Cordingley et al. | |
| 2003/0025074 A1 * | 2/2003 | Li | 250/288 |
| 2003/0151053 A1 * | 8/2003 | Sun et al. | 257/79 |
| 2004/0198028 A1 * | 10/2004 | Tanaka et al. | 438/487 |
| 2005/0041976 A1 * | 2/2005 | Sun et al. | 398/92 |
| 2005/0115937 A1 * | 6/2005 | Gu et al. | 219/121.69 |
| 2005/0184036 A1 * | 8/2005 | Hunter et al. | 219/121.69 |
| 2005/0254109 A1 | 11/2005 | Bruland et al. | |
| 2005/0270629 A1 | 12/2005 | Johnson | |
| 2005/0270630 A1 | 12/2005 | Johnson | |
| 2005/0270631 A1 * | 12/2005 | Johnson | 359/305 |
| 2005/0279807 A1 | 12/2005 | Johnson | |
| 2005/0279808 A1 | 12/2005 | Johnson | |
| 2005/0281102 A1 | 12/2005 | Bruland | |
| 2005/0282319 A1 | 12/2005 | Bruland et al. | |
| 2005/0282407 A1 * | 12/2005 | Bruland et al. | 438/795 |
| 2006/0007434 A1 * | 1/2006 | Furman et al. | 356/237.2 |
| 2006/0027540 A1 * | 2/2006 | Bruland et al. | 219/121.61 |
| 2006/0028655 A1 | 2/2006 | Cordingley et al. | |
| 2006/0028710 A1 | 2/2006 | Johnson et al. | |
| 2006/0076327 A1 * | 4/2006 | Kobayashi et al. | 219/121.73 |
| 2006/0086702 A1 | 4/2006 | Smart | |
| 2006/0151704 A1 | 7/2006 | Cordingley | |
| 2006/0191884 A1 | 8/2006 | Johnson et al. | |
| 2006/0192845 A1 | 8/2006 | Cordingley et al. | |
| 2006/0207975 A1 | 9/2006 | Ehrmann et al. | |
| 2007/0020785 A1 | 1/2007 | Bruland et al. | |
| 2007/0062917 A1 * | 3/2007 | Fu et al. | 219/121.67 |
| 2007/0106416 A1 | 5/2007 | Griffiths et al. | |
| 2008/0093349 A1 | 4/2008 | Bruland et al. | |
| 2008/0205242 A1 * | 8/2008 | Hendriks et al. | 369/112.02 |

OTHER PUBLICATIONS

I.C. Chang, "Acoustooptic Devices and Applications," IEEE Trans. Sonics and Ultrason., vol. SU-23, Jan. 1976, pp. 2-22.

Saleh, B.E.A. and Teich, M.C., "Fundamentals of Photonics," John Wiley & Sons, Inc., New York, 1991, pp. 818-820.

NTT News Release, "Discovery of a Novel Beam Scanning Phenomenon—High-Speed, Compact Optical Beam Scanner is realized with KTN Crystal," available at <<http://www.ntt.co.jp/news/news06e/0605/060518.html>>, last accessed May 11, 2007.

* cited by examiner

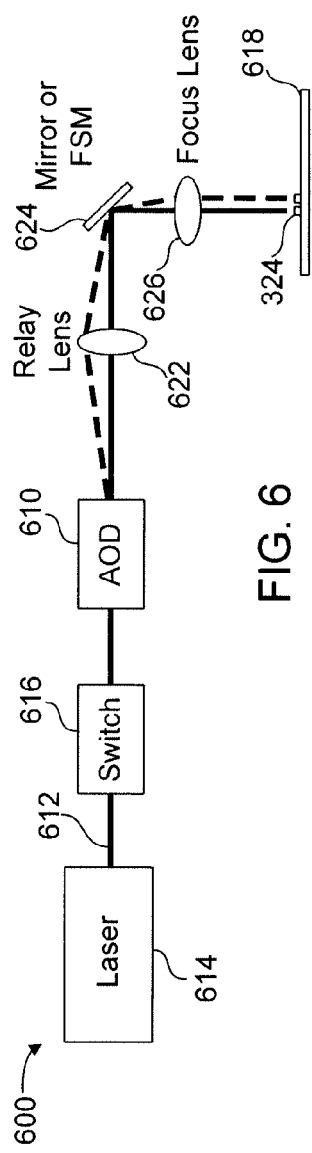
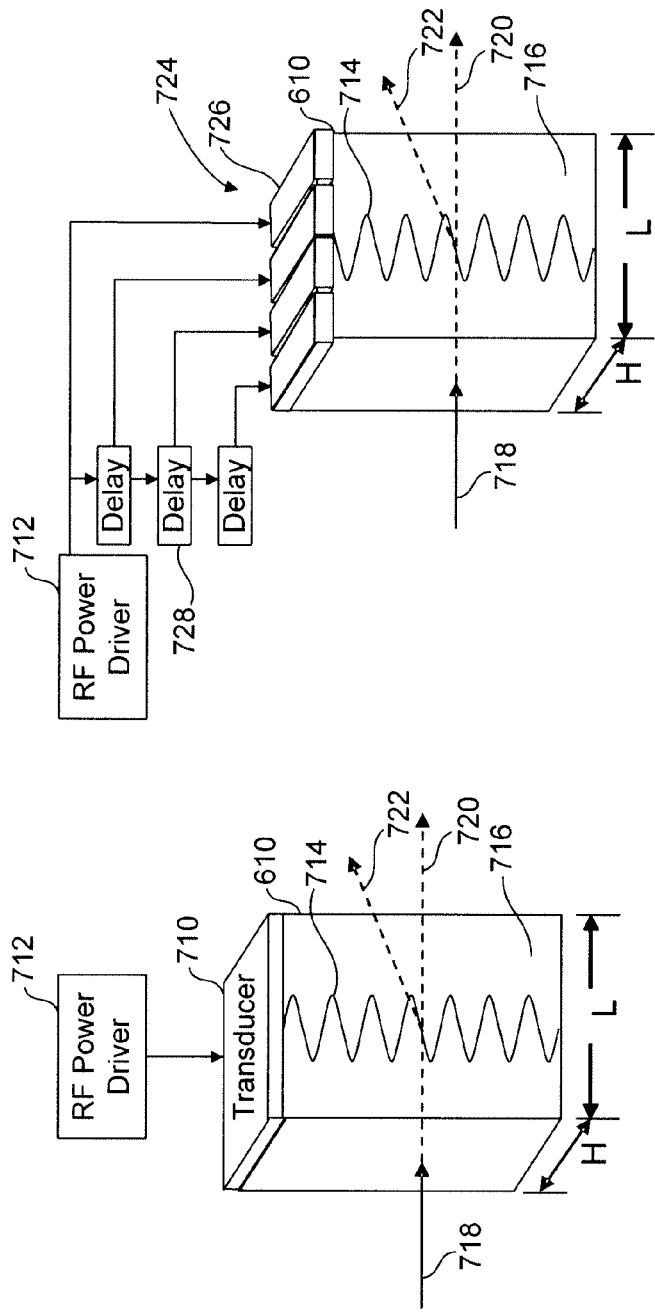
FIG. 6
FIG. 7A
FIG. 7B

SYSTEMS AND METHODS FOR PROCESSING SEMICONDUCTOR STRUCTURES USING LASER PULSES LATERALLY DISTRIBUTED IN A SCANNING WINDOW

TECHNICAL FIELD

This disclosure relates generally to manufacturing semiconductor integrated circuits. In particular, this disclosure relates to the use of laser beams to process structures on or within a semiconductor integrated circuit.

BACKGROUND INFORMATION

During fabrication, ICs (integrated circuits) often incur defects for various reasons. For that reason, IC devices are usually designed to include redundant circuit elements, such as spare rows and columns of memory cells in semiconductor memory devices, e.g., a DRAM (dynamic random access memory), an SRAM (static random access memory), or an embedded memory. Such devices are also designed to include particular laser-severable links between electrical contacts of the redundant circuit elements. Such links can be removed, for example, to disconnect a defective memory cell and to substitute a replacement redundant cell. Links may also be removed for identification, configuration and voltage adjustment. Similar techniques are also used to sever links in order to program or configure logic products, such as gate arrays or ASICs (application-specific integrated circuits). After an IC has been fabricated, its circuit elements are tested for defects, and the locations of defects may be recorded in a database. Combined with positional information regarding the layout of the IC and the location of its circuit elements, a laser-based link processing system can be employed to remove selected links so as to make the IC useful.

Laser-severable links are typically about 0.5-1 microns (μm) thick, about 0.5-1 μm wide, and about 8 μm in length. Circuit elements in an IC, and thus links between those elements, are typically arranged in a regular geometric arrangement, such as in regular rows. In a typical row of links, the center-to-center pitch between adjacent links is about 2-3 μm. These dimensions are representative, and are declining as technological advances allow for the fabrication of workpieces with smaller features and the creation of laser processing systems with greater accuracy and smaller focused laser beam spots. Although the most prevalent link materials have been polysilicon and like compositions, memory manufacturers have more recently adopted a variety of more electrically conductive metallic link materials that may include, but are not limited to, aluminum, copper, gold nickel, titanium, tungsten, platinum, as well as other metals, metal alloys, metal nitrides such as titanium or tantalum nitride, metal silicides such as tungsten silicide, or other metal-like materials.

Conventional laser-based semiconductor link processing systems focus a single pulse of laser output having a pulse width of about 4 to 30 nanoseconds (ns) at each link. The laser beam is incident upon the IC with a footprint or spot size large enough to remove one and only one link at a time. When a laser pulse impinges a polysilicon or metal link positioned above a silicon substrate and between component layers of a passivation layer stack including an overlying passivation layer, which is typically 2000-10,000 angstroms (Å) thick, and an underlying passivation layer, the silicon substrate absorbs a relatively small proportional quantity of infrared (IR) radiation and the passivation layers (silicon dioxide or silicon nitride) are relatively transparent to IR radiation. IR and visible laser wavelengths (e.g., 0.532 μm, 1.047 μm, 1.064 μm, 1.32 μm, and 1.34 μm) have been employed for more than 20 years to remove circuit links.

Many conventional semiconductor link processing systems employ a single laser pulse focused into a small spot for link removal. Banks of links to be removed are typically arranged on the wafer in a straight row, an illustrative one of which is shown in FIG. 1. The row need not be perfectly straight, although typically it is quite straight. The links are processed by the system in a link run 120, which is also referred to as an on-the-fly ("OTF") run. During a link run, the laser beam is pulsed as a stage positioner passes the row of links across the location of the focused laser spot 110. The stage typically moves along a single axis at a time and does not stop at each link position. Thus, the link run is a processing pass down a row of links in a generally lengthwise direction (e.g., horizontally across the page as shown). Moreover, the lengthwise direction of the link run 120 need not be exactly perpendicular to the lengthwise direction of the individual links that constitute the row, although that is typically true.

Impingent upon selected links in the link run 120 is a laser beam whose propagation path is along an axis. The position at which that axis intersects the workpiece continually advances along the link run 120 while pulsing the laser to selectively remove links. The laser is triggered to emit a pulse and sever a link when the wafer and optical components have a relative position such that the pulse energy impinges upon the link (e.g., trigger position 130). Some of the links are not irradiated and left as unprocessed links 140, while others are irradiated to become severed links 150.

FIG. 2 illustrates a typical link processing system that adjusts the position of the spot 110 by moving a wafer 240 in an XY plane underneath a stationary optics table 210. The optics table 210 supports a laser 220, a mirror 225, a focusing lens 230, and possibly other optical hardware. The wafer 240 is moved underneath in the XY plane by placing it on a chuck 250 that is carried by a motion stage 260.

FIG. 3 depicts the processing of the wafer 240. A conventional sequential link blowing process requires scanning the XY motion stage 260 across the wafer 240 once for each link run. Repeatedly scanning back and forth across the wafer 240 results in complete wafer processing. A machine typically scans back and forth processing all X-axis link runs 310 (shown with solid lines) before processing the Y-axis link runs 320 (shown in dashed lines). This example is merely illustrative. Other configurations of link runs and processing modalities are possible. For example, it is possible to process links by moving the wafer or optics rail. In addition, link banks and link runs may not be processed with continuous motion.

For a wafer 240 comprising DRAM, for example, memory cells (not shown) may be located in the areas 322 between the X-axis link runs 310 and the Y-axis link runs 320. For illustrative purposes, a portion of the wafer 240 near an intersection of an X-axis link run 310 and a Y-axis link run 320 is magnified to illustrate a plurality of links 324 arranged in groups or link banks. Generally, the link banks are near the center of a die, near decoder circuitry, and not above any of the array of memory cells. The links 324 cover a relatively small area of the total wafer 240.

For this example, the primary system parameters that impact the time spent executing link runs, and thus throughput, are the laser pulse repetition frequency (PRF) and motion stage parameters such as stage acceleration, bandwidth, settling time, and the commanded stage trajectory. The commanded stage trajectory includes acceleration and deceleration segments, constant velocity processing of link banks, and "gap profiling" or accelerating over large gaps between links to be processed in a link run.

Most improvements to system throughput over the past several years have primarily focused upon enhancing the stage and laser parameters. Improvements in these areas will continue. However, practical limitations associated with these parameters make this a difficult way to achieve large throughput gains. Stage acceleration and velocity are not increasing as fast as laser PRF. Thus, it may be difficult to take the most advantage of forthcoming high PRF lasers (e.g., PRFs in the hundreds of kHz or MHz ranges).

Increasing peak stage acceleration, for example, provides only a limited throughput improvement. Present motion stages are capable of moving a wafer with a full field travel greater than 300 mm (millimeters), with 1 to 2 G accelerations, while maintaining a positional accuracy on the order of 100 nm (nanometers). Increasing stage acceleration introduces additional vibrations and generates heat, both of which can decrease system accuracy. Significantly increasing the stage acceleration and bandwidth, without diminishing the positional accuracy or increasing the system footprint, is a challenging and costly engineering endeavor, and the benefits of that effort would only be moderate.

Increasing the laser PRF, and hence link run velocity, is also undesirable for a number of reasons. First, there are unfavorable changes in the laser pulses that result from increasing the PRF. For a given laser cavity, as the inter-pulse period decreases, the laser pulse width increases. This may decrease the processing efficiency on some link structures. Higher laser PRFs are also associated with less energy stability, which also decreases processing efficiency. Higher laser PRFs can also result in lower pulse power, although that is usually not a problem when processing links that use a small spot size.

High laser PRFs are also undesirable when applied to semiconductor products that have a large link pitch. The combination of high PRF and large link pitch requires that a very high stage velocity be used for processing links. A high stage velocity requires more stage acceleration and deceleration and decreases the opportunity to take advantage of gaps of unprocessed links in a run. These effects diminish some of the throughput improvements from the higher link run velocity. A high stage velocity also requires a tighter timing tolerance when triggering the generation of laser pulses in order to maintain accuracy. Processing at high stage velocities may also not be possible if these velocities exceed some system specification, such as the maximum stage or position feedback sensor velocity.

Improvements to system throughput have been achieved using semiconductor link processing systems that employ multiple laser pulses focused into respective spots on a wafer surface at the same time for parallel link processing. For example, two focused laser spots on one or more links may allow one physical pass of a wafer while processing two rows of links. Such systems may provide improved system throughput. However, multiple beam systems are generally larger, more complicated, and more expensive than single beam systems because two or more beam paths are provided. If polarizing optics are used to split and combine laser beams in a multiple beam system, it is also difficult to produce more than two spots at the same time due to energy losses. Further, pulses in different beam paths of a multiple beam system that are applied at the same time and in the same general location may interfere with each other, causing undesirable energy fluctuations.

Continued shrinkage of the feature sizes on semiconductor wafers will result in an increased number of links and link runs to process these wafers, further increasing wafer processing time. Future system throughput improvements of significant magnitude are unlikely to occur, however, through improvements in stage acceleration performance or laser PRF.

SUMMARY OF THE DISCLOSURE

The embodiments disclosed herein provide systems and methods for processing a plurality of structures, such as laser-severable links, on a semiconductor substrate. In one embodiment, a method provides a series of laser pulses to a first deflector configured to selectively deflect the laser pulses within a processing window. The method also includes scanning the processing window over the semiconductor substrate such that a plurality of laterally spaced rows of structures simultaneous pass through the processing window as the processing window is scanned. The method also includes selectively deflecting the series of laser pulses among the laterally spaced rows within the processing window. A first laser pulse is deflected to a first row of the laterally spaced rows and a second laser pulse is deflected to a second row of the laterally spaced rows. The second laser pulse is deflected to the second row within 100 µs after the first laser pulse is deflected to the first row. In one embodiment, the method also includes providing the deflected laser pulses from the first deflector to a second deflector. The first deflector is configured to deflect the laser pulses in a first direction, and the second deflector is configured to deflect the laser pulses in a second direction.

In one embodiment, a system for processing structures on or within a semiconductor substrate includes a laser source configured to generate a series of laser pulses and a deflector configured to receive the series of laser pulses and to selectively deflect the series of pulses within a processing window. The system also includes a motion stage configured to scan the processing window with respect to the semiconductor substrate. A plurality of laterally spaced rows of structures simultaneously pass through the processing window as the processing window is scanned. The deflector includes a switching time of approximately 100 µs or less. The deflector is further configured to selectively deflect the series of laser pulses among the laterally spaced rows within the processing window.

In one embodiment, a laser processing system includes pulse generation means for generating a series of laser pulses, motion means for moving a processing window in a first direction with respect to a workpiece, and deflection means for selectively deflecting the series laser pulses in a second direction with respect to the workpiece. The deflection means is configured to deflect a first laser pulse to a first structure on the workpiece within the processing window and a second laser pulse to a second structure on the workpiece within the processing window. The deflection means is also configured to deflect the second laser pulse to the second structure within 100 µs after deflecting the first laser pulse to the first structure.

Additional aspects and advantages will be apparent from the following detailed description of preferred embodiments, which proceeds with reference to the accompanying drawings.

BRIEF DESCRIPTION OF THE DRAWINGS

FIG. 6 is a schematic diagram of a laser processing system comprising an acousto-optic deflector (AOD) according to one embodiment.

FIGS. 7A and 7B are schematic diagrams of an AOD according to certain embodiments.

DETAILED DESCRIPTION OF PREFERRED EMBODIMENTS

Figure 1:
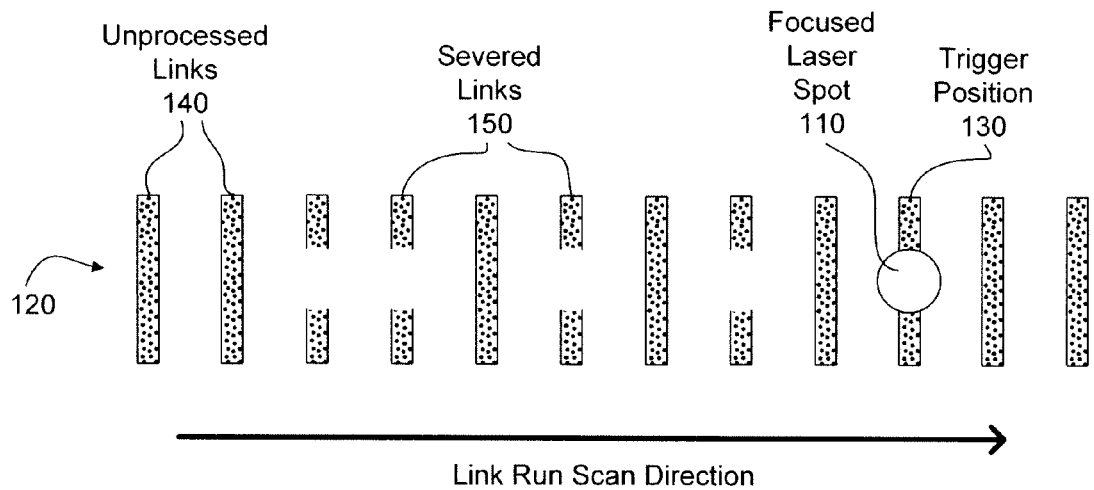
FIG. 1 is a schematic diagram illustrating a prior art row or bank of links being selectively irradiated with a laser spot scanning along a lengthwise direction of the bank.
Figure 2:
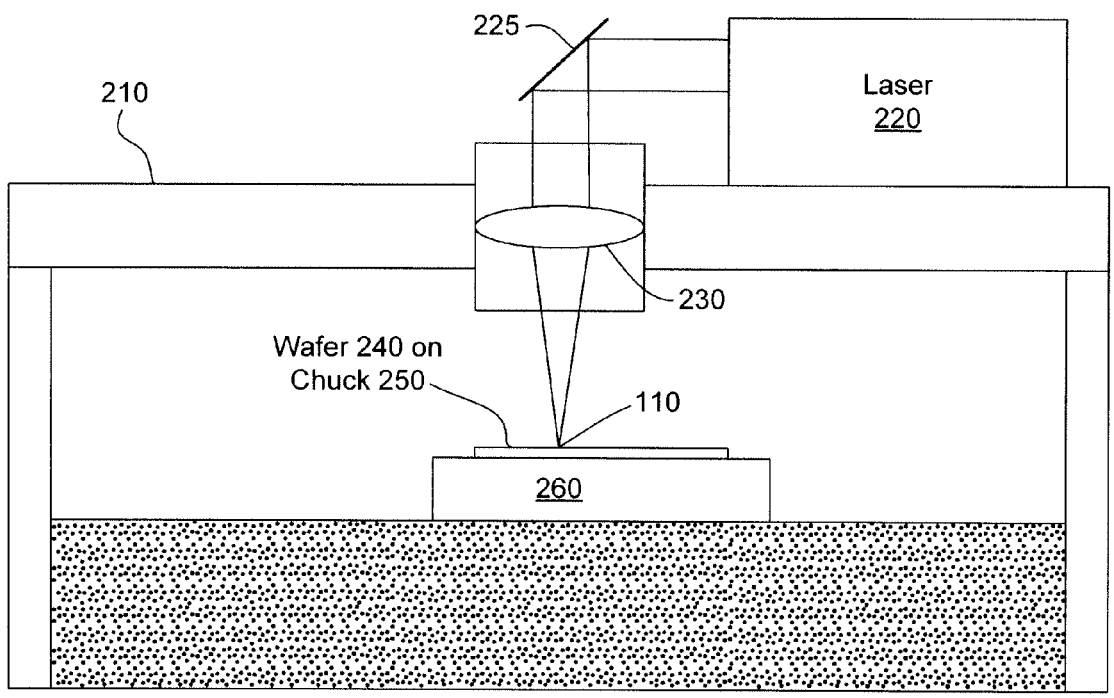
FIG. 2 is a schematic diagram of a prior art link processing system.

With reference to the above-listed drawings, this section describes particular embodiments and their detailed construction and operation. The principles, methods, and systems disclosed below have general applicability for processing any structure on or within a semiconductor substrate using laser radiation for any purpose. While the examples and embodiments that follow are described in the context in which those structures are laser-severable links on or within an IC (e.g., memory device, logic device, optical or optoelectronic device including LEDs, and microwave or RF devices), other structures besides laser-severable links can be processed in the same or similar manner. Thus, the teachings set forth herein are equally applicable to the laser processing of other types of structures, such as electrical structures that become conductive as a result of laser radiation, other electrical structures, optical or electro-optical structures, and mechanical or electro-mechanical structures (e.g., MEMS (micro electro-mechanical structures) or MOEMS (micro opto-electro-mechanical structures)).

The purpose of the irradiation may be to sever, cleave, make, heat, alter, diffuse, anneal, or measure a structure or its material. For example, laser radiation can induce a state change in a structure's material, cause the migration of dopants, or alter magnetic properties—any of which could be used to connect, disconnect, tune, modify, or repair electrical circuitry or other structures.

As one skilled in the art will appreciate in light of this disclosure, certain embodiments are capable of achieving certain advantages over the known prior art, including some or all of the following: (1) increasing throughput, possibly by multiplicative factors, e.g., by a factor of 2, 3, or more; (2) decreasing floor space required for link processing equipment in a fabrication facility; (3) decreasing the time elapsing between scanning alignment targets and completing link processing, thereby (a) allowing less time for thermal drift of the components and structure of the semiconductor processing system, resulting in enhanced system accuracy, (b) enabling larger wafer processing fields, which results in longer link runs and an additional throughput improvement, and (c) permitting less frequent rescanning of alignment targets when thermal shifts are detected or when the time elapsed since their previous scan becomes too large, thus further enhancing throughput by reducing the number of operations necessary for accurate link processing; and (4) allowing beneficial relaxation of some present system parameters, such as XY stage acceleration and laser pulse repetition frequency, while still processing wafers at a rate that is equivalent to or faster than present link processing systems.

As an example of the latter advantage, lowering the stage acceleration requirements can reduce the thermal energy released into the system environment, reducing thermal shifts that occur during wafer processing. Lower acceleration also improves accuracy by reducing the excitation of system resonances and vibrations, resulting in smoother, gentler, more stable system operation. Motion stages can also be selected with a lower cost, preferential mechanical configuration, greater simplicity, and no need for auxiliary cooling systems if a reduced acceleration is acceptable.

As another example, a laser source with a lower PRF could be used for processing. Lower PRF lasers may have improved pulse properties such as faster rise time, enhanced pulse stability, increased peak pulse power, and shorter pulse width. Lower PRF lasers may also be less costly and may be operable with smaller power supplies that generate less heat. These and other advantages of various embodiments will be apparent upon reading this disclosure.

As used herein: the term "on" means not just directly on but atop, above, over, or covering, in any way, partially or fully. Also the term "substantially" is a broadening term that means about or approximately but does not imply a high degree of closeness.

Reference is now made to the figures in which like reference numerals refer to like elements. For clarity, the first digit of a reference numeral indicates the figure number in which the corresponding element is first used. In the following description, numerous specific details are provided for a thorough understanding of the embodiments disclosed herein. However, those skilled in the art will recognize that the embodiments can be practiced without one or more of the specific details, or with other methods, components, or materials. Further, in some cases, well-known structures, materials, or operations are not shown or described in detail in order to avoid obscuring aspects of the embodiments. Furthermore, the described features, structures, or characteristics may be combined in any suitable manner in one or more embodiments.

I. Analysis of Link Run Processing Time

Generally, the current true utilization of laser pulses in a link processing system is quite low. For example, a typical wafer including approximately 600,000 links may be processed in approximately 600 seconds. This represents an effective blow rate of 1 kHz. If this example wafer processing system uses a laser source with a 70 kHz pulse repetition frequency (PRF), only about one out of every seventy possible laser pulses reaches the surface of the wafer.

Measurements from the repair of typical DRAM wafers show that the time to execute link runs accounts for the majority of wafer processing time. Approximately 80% of total processing time may be spent executing link runs, and the remaining 20% is spent performing overhead tasks, such as moving the wafer to shift the cutting laser from the end of one link run to the start of the next link run, alignment, focusing, and computational overhead. Because the dominant component of link processing time is typically spent executing link runs, significant reductions in wafer processing time can result from reducing the time spent executing link runs.

Figure 4:
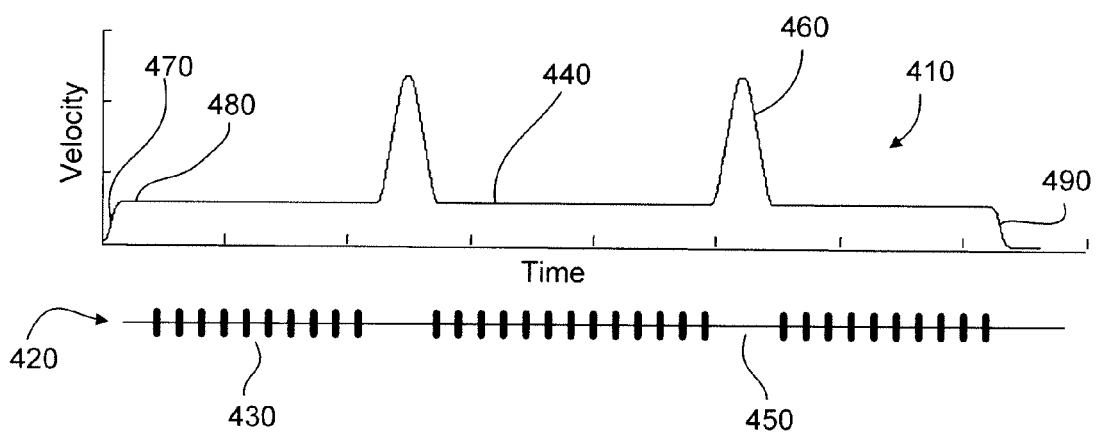
FIG. 4 is a schematic diagram illustrating a link run velocity profile corresponding to the processing of a link run according to one embodiment.

FIG. 4 illustrates a link run velocity profile 410 corresponding to the processing of a link run 420 according to one embodiment. As used herein, the term "velocity profile" means velocity as a function of time or distance over a span of time or an interval of distance. Link run execution includes of a number of different operations. While processing a bank 430 of links with a tight pitch spacing (e.g., the center-to-center distance between adjacent links in the same bank), the laser beam axis advances relative to the wafer at a nearly constant velocity 440. Note that, although FIG. 4 shows an example in which the constant velocity 440 is the same for each link bank 430 in the link run 420, it is possible that different link banks 430 may have different constant velocities, such as when the pitch spacing differs from bank to bank in the same link run.

When there is a large gap 450 between subsequent links in a link run, the system accelerates to span the gap 450 in less time and then decelerates near the end of the gap to reach a nominal velocity once again. The acceleration and deceleration results in a gap profile 460 in the link velocity profile 410. At the beginning of a link run, the system undergoes an initial acceleration 470 from a resting position followed by a period of settling 480. At the end of a link run, the system undergoes a deceleration 490 back down to zero velocity. Thus, the typical operations that the system performs during execution of a link run include ramping up the stage to constant velocity, settling, processing links at constant velocity, accelerating (gap profiling) over any large gaps, and ramping back down to zero velocity at the end of the run. FIG. 4 illustrates the effect of these operations on link run on-axis velocity (in the link run scan direction). Note that while the link run 420 is depicted as a straight line through collinear link banks, it is possible for the banks of links to not be in line. The link run 420 would then include lateral position commands as well.

A gap profiling operation involves accelerating, decelerating, and settling to travel between two links in less time than would be required at constant velocity. The increased throughput provided by gap profiling is dependent upon the quantity and spacing of large gaps between links, the acceleration capabilities of the stage, the settle time, and the link run velocity. A greater time savings results on products that have many large gaps in link runs and a small link pitch.

Generally, the time spent accelerating and decelerating at the start and end of link runs is approximately 1.5% of the time spent on link runs. The time saved with gap profiling is approximately 50% of the time that would be required to traverse the link runs at constant velocity. These numbers vary widely for different types of wafers. Workpieces with few or no large gaps between links may not receive any benefit from gap profiling. On the other hand, products with sparse or random link layout may receive greater benefit from gap profiling.

II. Processing Multiple Link Banks with a Deflected Laser Beam

In one embodiment, multiple link banks within a processing window are processed with a deflected laser beam. As laser PRFs increase faster than XY stage performance, the accelerations and velocities to keep up with the high PRF lasers are not available. Thus, a laser beam according to one embodiment is temporally decimated into a plurality of effective beams. The plurality of effective beams may share the same optics in a beam path. In another embodiment, the plurality of effective beams includes beam paths that have physically separate optics for each beam.

A beam deflector is configured to perform the temporal decimation. The beam deflector may include, for example, an acousto-optic deflector (AOD), an electro-optic deflector (EOD), a fast steering mirror (FSM), a deformable mirror, a rotating polygon, an actuated mirror, a tilt plate, or any other beam steering technology known in the art. An example optimized AOD embodiment is described in greater detail below. However, an artisan will recognize from the disclosure herein that other high speed beam steering devices may be used in other embodiments. For example, in one embodiment, a high speed, electro-optical beam scanner is used such as a KTN (KTal-xNbxO3, Potassium Tantalate Niobate) crystal available from Nippon Telegraph and Telephone Corp. of Tokyo, Japan.

In one embodiment, the workpiece may be moved in addition to or instead of the laser beam to impart relative motion between a focused spot and the workpiece. Such an embodiment may also be considered herein as a beam "deflector."

Deflecting a laser beam among multiple link banks may take many different forms, with laser pulses being delivered to links with a different lateral (cross-axis) spacing, different on-axis spacing, different on-axis and cross-axis spacing, or no difference in link spacing. For example, FIGS. 5A-5F are schematic diagrams illustrating several ways in which a laser processing system according to certain embodiments may deliver a serialized sequence of pulses that effectively process two or more laterally spaced link banks.

Figure 5A:
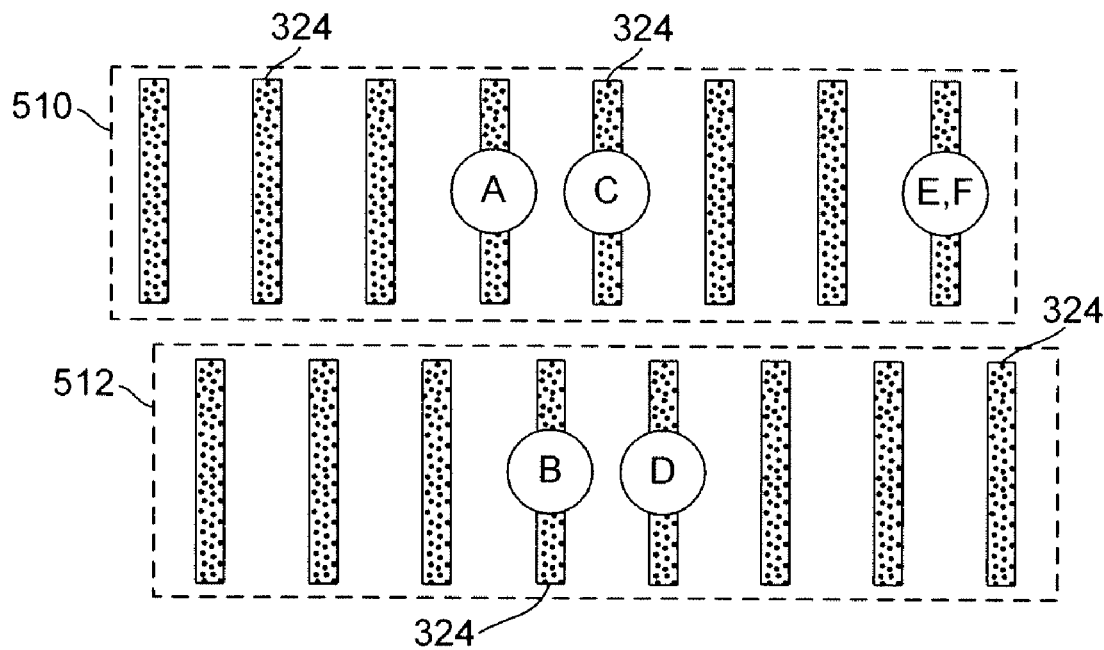
FIGS. 5A-5F are schematic diagrams illustrating several ways in which a laser processing system may deliver a serialized sequence of pulses to process two or more laterally spaced link banks according to certain embodiments.
Figure 5B:
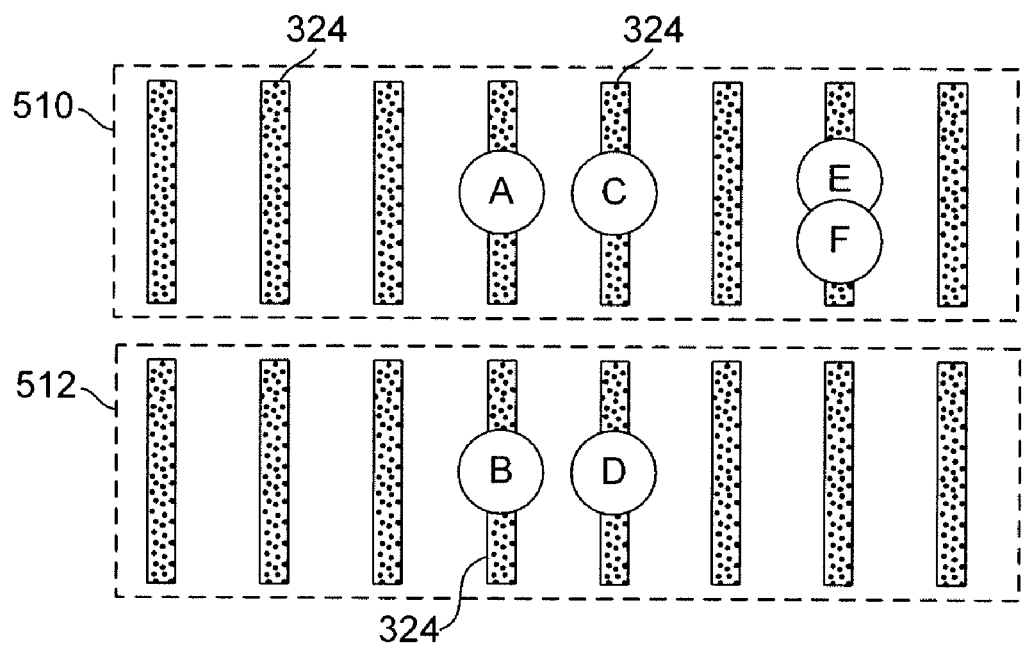

In FIG. 5A, a sequence of laser spots (A, B, C, D, E, F) is delivered to a plurality of links 324 in a first link bank 510 and a second link bank 512 using a deflected laser beam. In this example, the link banks 510, 512 are laterally spaced, substantially parallel, and offset (e.g., the links 324 in the first link bank 510 are not directly aligned with the links 324 in the second link bank 512). In FIG. 5B, the link banks 510, 512 are not offset. As shown, the laser spots according to one embodiment may be deflected in a horizontal direction, a vertical direction, or a combination of horizontal and vertical directions to impinge upon the links 324 in both link banks 510, 512. In the embodiments shown in FIGS. 5A and 5B, the focused spots A, B, C, D sequentially advance horizontally across the link runs 510, 512 as they alternate in the cross-axis (lateral) direction between the first link run 510 and the second link run 512.

Although we say that the spots A, B, C, D advance along their respective link banks 510, 512, that is a linguistic shorthand. More precisely, a spot results from a laser beam when the laser beam is on. In the case of an intermittent laser beam, such as a pulsed laser beam, the resulting spot on the IC workpiece comes and goes as the laser beam turns on and off. However, the laser beam propagates along an axis of propagation, and that axis always exists whether the beam is on or not. Thus, to be precise, a laser beam axis may move along a link run. At any given time during the link run, the axis intersects the IC workpiece either on a link or between two adjacent links. When a laser beam axis intersects a link that has been selected for removal, the laser beam is energized to sever the link. When the laser axis is moving along a bank of regular spaced links (with an approximately uniform pitch), the laser beam can be pulsed periodically at a rate equivalent to and synchronized in phase with the axis's crossing of links. The laser pulses can be selectively passed or blocked to sever a given link or leave it intact.

While the spots (e.g., A, B, C . . . ) are illustrated as having a circular shape in FIGS. 5A-5E (and in other drawings), they may have any arbitrary shape.

As already mentioned, an advantage of laterally deflecting the spots A, B, C, D between a plurality of link banks 510, 512 is that wafer processing can be accomplished with fewer link runs, resulting in much greater throughput without any laser or motion stage enhancements. However, an artisan will recognize from the disclosure herein that a deflector may selectively distribute laser pulses among a plurality of link banks in a variety of different patterns. For example, as shown in FIGS. 5A and 5B, two successive laser spots E, F may be applied to the same link in either a substantially same location (FIG. 5A) or at slightly offset locations (FIG. 5B). In one embodiment, the beam deflector adjusts to provide the successive laser spots E, F to the same link during a link run with continuous relative motion between the workpiece and the XY motion stage of the laser processing system.

Figure 5C:
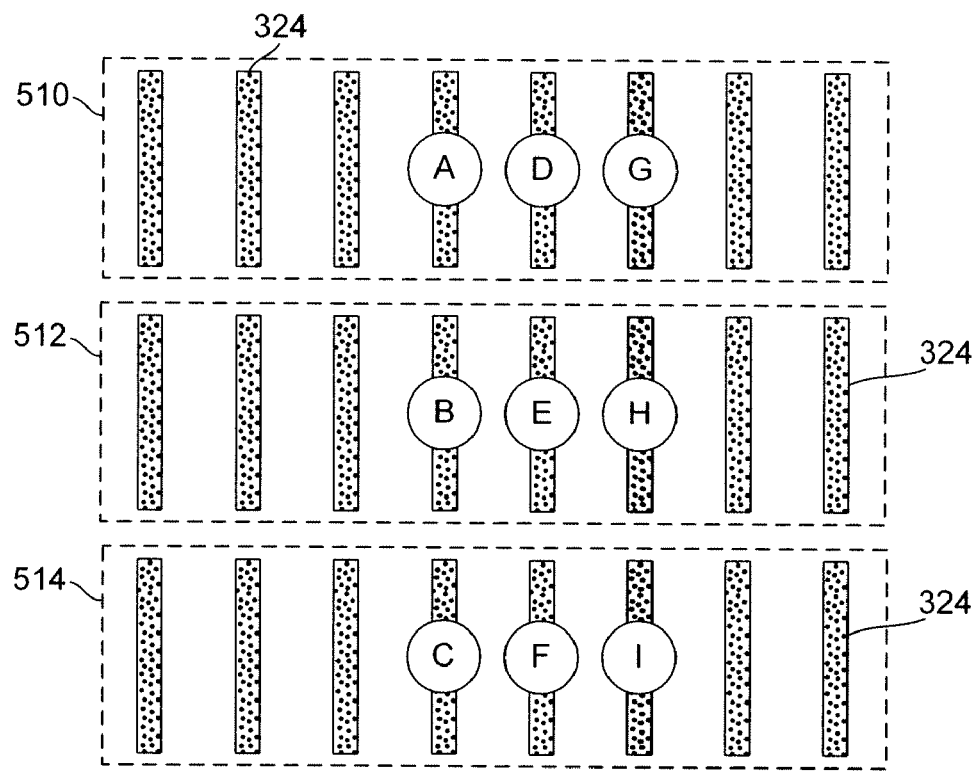

In FIG. 5C, a sequence of laser spots (A, B, C, D, E, F, G) is delivered to a plurality of links 324 in a first link bank 510, a second link bank 512, and a third link bank 514 using a deflected laser beam. Depending on the range of the particular deflector used to direct the laser beam, more than three link banks 510, 512, 514 may also be processed at the same time. Further, while FIG. 5C illustrates the laser spots being sequentially applied to the first link bank 510 (e.g., laser spot A), then to the second link bank 512 (e.g., laser spot B), followed by the third link bank (e.g., laser spot C), in a repeating pattern, an artisan will recognize that this disclosure is not so limited. Indeed, in one embodiment, the spots may be sequentially applied to any of the links 324 in any of the link banks 510, 512, 514 in any order.

Figure 5D:
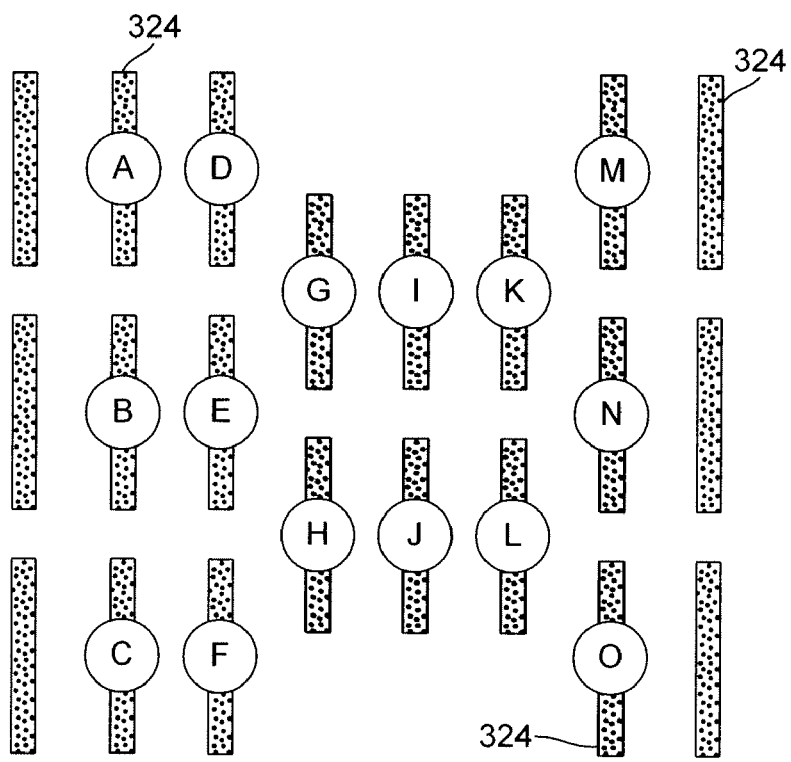

Further, an artisan will recognize from the disclosure herein that any pattern of links or link banks may be processed by the deflected sequence of laser spots. For example, FIG. 5D illustrates a plurality of links 324 arranged in both lateral and offset configurations. Although not shown, many different on-axis spaced link bank configurations and/or combinations of cross-axis and on-axis configurations may be processed according to the systems and methods disclosed herein. In one embodiment, different processing modes may be used between applying laser spots to two subsequent links. Thus, any configuration of links may be processed in any sequence within a processing window corresponding to the deflector's range of deflection angles.

Figure 5E:
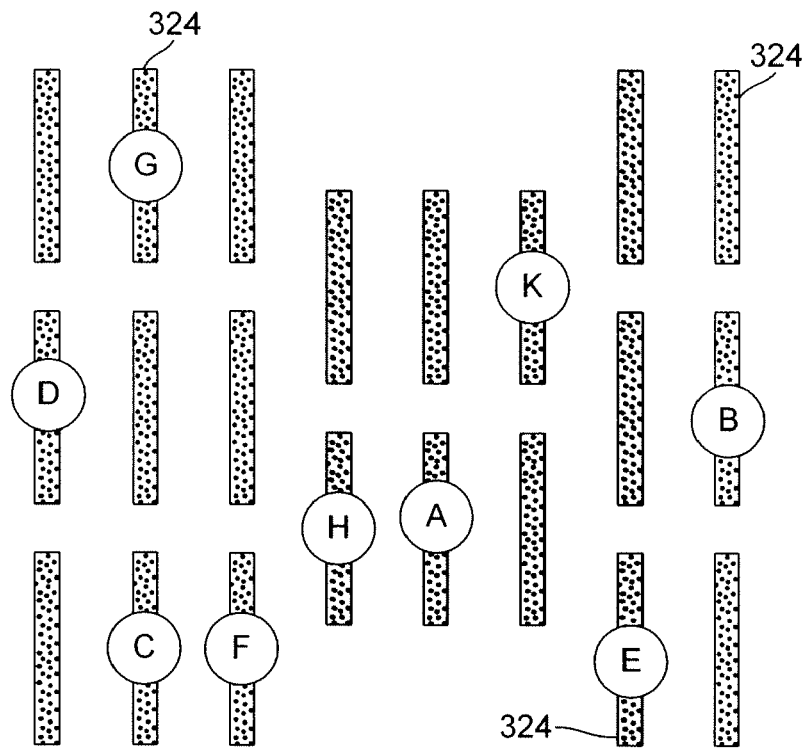
Figure 5F:
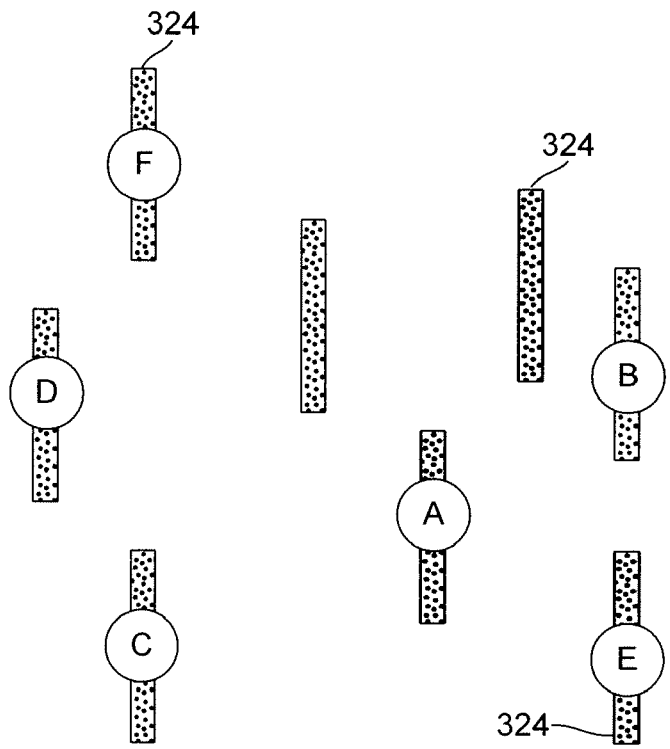

An artisan will understand from the disclosure herein that the pattern and order of link blows in FIGS. 5A-5D is merely illustrative. Any desired sequence of pulses within a processing window may be processed, or not processed, in any order. For example, in FIG. 5D, it is possible to process in a different order such as (D, F, N, O, K, A, C, E, L) where processing occurs with sequential, or non-sequential pulses out of the laser. As another example, FIG. 5E illustrates a plurality of links 324 arranged in a pattern as shown in FIG. 5D. However, in FIG. 5E a random sequence of laser spots (A, B, C, D, E, F, G, H) is delivered to selected links in the plurality of links 324. Further, an artisan will recognize that it is not necessary to direct a laser pulse down a beam path towards, and block the laser pulse from hitting, a link that does not require processing. Rather, it may be more efficient to direct the laser pulse down a beam path requiring processing so as to minimize the number of blocked pulses. An artisan will also understand from the disclosure herein that a row of links may only include a single link. For example, in FIG. 5F the links 324 are randomly organized such that no two links are in the same row (e.g., in the on-axis direction).

III. AOD Optimization

As discussed above, in one embodiment an AOD may be used to deflect a series of laser pulses among a plurality of link banks. For example, FIG. 6 is a schematic diagram of a laser processing system 600 comprising an AOD 610 according to one embodiment. As discussed in detail below, in this example embodiment the AOD 610 comprises a very high speed device configured to deflect a pulsed laser beam 612 emitted by a laser 614 such that two sequential pulses may be delivered to two different links in two laterally spaced link banks. In one embodiment, the AOD 610 is configured to deflect laser pulses in one dimension (e.g., perpendicular to a scanning direction). In another embodiment, the AOD 610 is configured to deflect laser pulses in two dimensions (e.g., perpendicular to a scanning direction and parallel to the scanning direction). In other embodiments, two AODs (e.g., see AODs 610 and 1312 in FIGS. 13 and 14) are used to provide deflection in a two dimensions.

In one embodiment, the laser processing system 600 also includes a switch 616 configured to allow or block laser pulses from reaching a workpiece 618 (e.g., a semiconductor wafer including a plurality of links 620). The switch 616 may include an AOD or acousto-optic modulator (AOM) device. In one embodiment, however, the switch 616 and the AOD 610 comprise a single device configured to selectively direct the pulsed laser beam 612 to a beam dump (not shown) to block laser pulses from reaching the workpiece 618.

As also shown in FIG. 6, the laser processing system 600 may also include a relay lens 622 to direct differently deflected beam paths (illustrated exiting the AOD 610 as a solid line and a dashed line) to a same location on a mirror 624 (or other redirection device such as an FSM) corresponding to an entrance pupil of a focus lens 626. In operation, different deflection angles provided by the AOD 610 result in different pulses being directed to different locations (e.g., links 620) on the workpiece 618. Although not shown, in one embodiment, a controller configured to execute instructions stored on a computer readable medium controls the AOD 610 so as to selectively deflect a sequence of laser pulses to desired locations on the workpiece 618.

An artisan will recognize from the disclosure herein that the system 600 is provided by way of example and that other system configurations are possible. Indeed, various other example system embodiments are provided below.

In some embodiments, various parameters of the AOD 610 are optimized to provide desired AOD performance. The AOD 610 may be optimized to achieve, for example, a desired switching speed, a desired range and resolution of deflection angles, and/or a desired optical transmission efficiency. In one embodiment, for example, AOD parameters are optimized to achieve a switching time of less than approximately 100 μseconds such that the AOD 610 switches faster than an example 10 kHz laser. In another embodiment, for example, the AOD parameters are optimized to achieve a switching time of less than approximately 10 μseconds such that the AOD 610 switches faster than an example 100 kHz laser.

In certain embodiments, the AOD 610 is optimized with a deflection angle of approximately +/−4 mradians so as to provide a processing window approximately +/−25 μm wide at the workpiece 618 with the focus lens 626 having a focal length of approximately 6.25 mm. Assuming, for example, a 0.5 μm spot size, this requires 100 resolvable spots. Thus, the AOD 610 may be further optimized to achieve such a resolution. The AOD 610 is also optimized, according to one embodiment, to achieve a deflection angle with a precision of less than approximately 0.8 μradians for precise targeting. In addition, or in another embodiment, the AOD 610 is further optimized to achieve an optical transmission efficiency of greater than approximately 50% to reduce loss of laser pulse energy.

The following discussion provides specific examples for achieving such AOD optimization. However, an artisan will recognize from the disclosure herein that the following examples are not exclusive and that the AOD 610 may be optimized in any manner known in the art to achieve the desired switching speed, range and resolution of deflection angles, and/or optical transmission efficiency discussed above.

It is well known that in the Bragg regime of operating an acousto-optic device, the normalized intensity produced in a first-order diffracted beam is given to a good approximation by $$I = (\sin^2 \sqrt{\eta}) \cdot \frac{\sin^2(\Delta k_1 L/2)}{(\Delta k_1 L/2)^2}, \quad (1)$$

where $$\eta = \frac{\pi^2}{2\lambda^2} M_2 \frac{P_a L}{H} \quad (2)$$

is the acousto-optic interaction efficiency for a Bragg cell.

In equations (1) and (2) above, L (see FIGS. 7A and 7B) is an acoustic field length (along the optical wave propagation direction), H (see FIGS. 7A and 7B) is an acoustic field height (transverse to the optical and acoustic wave propagation directions), $\Delta k_1$ is a Bragg angle (momentum) mismatch, λ is an optical wavelength in an acousto-optic medium, $P_a$ is an acoustic power, and $M_2$ is an acousto-optic figure of merit of the Bragg cell material.

For good efficiency (large η), desirable parameters include a long acoustic interaction length L, a small acoustic field height H, and a Bragg cell material with a large figure of merit $M_2$. In one embodiment, one or more of these parameters are adjusted to maintain the efficiency η above a threshold value.

When operating the acousto-optic device as a deflector, the direction of the diffracted beam is varied by changing a drive frequency f of an acoustic wave within the AOD 610. It can be shown that the resolution (number of resolvable angular positions) N of the AOD 610 is given by $$N = \tau \Delta f, \quad (3)$$

where τ is an acoustic transit time across the optical beam and Δf is a frequency range over which the AOD 610 is operated.

Thus, τ is a measure of the speed (access time) of the AOD 610. Once a desired speed of the AOD 610 is specified, the only parameter available to maximize resolution N is the deflector bandwidth Δf.

By way of illustration, FIGS. 7A and 7B are schematic diagrams of an AOD 610 according to certain embodiments. The AOD 610 includes a length L and a height H. As shown in FIG. 7A, the AOD may include a transducer 710 configured to convert a radio frequency (RF) signal from an RF power driver into an acoustic wave 714 that sets up within the AOD 610. As the acoustic wave 714 transverses through the AOD 610, the acoustic wave 714 distorts an optical media 716 within the AOD 610, causing increases and decreases in indexes of refraction in the AOD 610. Thus, an incoming laser beam 718 is diffracted by the acoustic wave 714 and follows the laws of diffraction, resulting in a zero-order beam 720 that is on-axis and in one or more first-order (or higher-order) beams 722 at angles specified by equations relating to the diffraction process.

For the AOD 610 shown in FIG. 7A with a single transducer 710 of length L, the Bragg angle mismatch term $\Delta k_1$ determines the deflector bandwidth Δf. Generally, the AOD 610 operates at a center frequency $f_o$ at which the Bragg condition is satisfied ($\Delta k_1 = 0$). As the AOD 610 operates at frequencies further from the center frequency $f_o$, the Bragg angle mismatch $\Delta k_1$ increases. Because it is the product ($\Delta k_1$)(L) that determines the phase matching behavior (see, e.g., the second term on the right hand side of equation (1)), a single transducer device that has a shorter length L also has a larger scan bandwidth Δf.

It can be shown that $$\frac{\Delta f}{f_0} \approx 1.8 \frac{L_0}{L}, \quad (4)$$

where $$L_0 \equiv \frac{n \Omega_o^2}{\lambda} \quad (5)$$

is a characteristic length at the AOD 610. In equation (5), n is a refractive index of the Bragg cell and $\Omega_o$ is an acoustic wavelength at the center frequency $f_o$. Thus, to increase the AOD's bandwidth Δf, the AOD 610 is configured with a shorter acoustic field length L. However, using a shorter acoustic field length L is in conflict with the need or desire for good efficiency η.

The competing demands for good efficiency (large L) and high bandwidth (small L) can be addressed by replacing the single transducer 710 shown in FIG. 7A of length L with a linear array 724 of shorter transducers 726. In the example embodiment shown in FIG. 7B, the linear array 724 has an effective total length L.

In one embodiment, the relative phases of the transducers 726 in the linear array 724 are configured as a function of deflector frequency f to steer the acoustic beam 714 so that it minimizes the Bragg angle mismatch $\Delta k_1$ over the deflector bandwidth Δf. As shown in FIG. 7B, in one such embodiment, the AOD 610 includes a plurality of fixed delay circuits 728 (three shown) to introduce a time delay between adjacent transducers 726 such that at the center frequency $f_o$ the transducers 726 are all driven in phase. At frequencies f that are not equal to the center frequency $f_o$ ($f \neq f_o$), the phase shifts across the array 724 result in a net steering of the acoustic propagation direction that lessens the Bragg angle mismatch $\Delta k_1$ that would otherwise result from a single transducer (e.g., the transducer 710 shown in FIG. 7A) of the same effective length L. Thus, in one embodiment, the relative phases of the linear array are based on the selected deflector frequency f. An artisan will recognize from the disclosure herein that the relative phases of the transducers 726 in the array 724 may be selectively controlled (e.g., using variable delay between transducers 726 rather than a fixed delay). Further, in another embodiment, the transducer 710 shown in FIG. 7A may comprise a stepped transducer that is geometrically configured to alter the phase across its length L as a function of the deflector frequency f to steer the acoustic beam so as to reduce the Bragg angle mismatch $\Delta k_1$ over the deflector bandwidth $\Delta f$.

Because the dielectric constant of an acoustic transducer material such as $LiNbO_3$ is very high, the impedance presented by the transducer 710 (or transducers 726) at frequencies greater than 100 MHz is small (e.g., on order of a few Ohms). The impedance Z follows the scaling relation $$Z \sim \frac{1}{HLf_o^2}. \qquad (6)$$

The relation shown in equation (6) drives a need or desire for a small transducer area (HL) in order to raise the transducer impedance and facilitate the design of an impedance matching network between the drive electronics and the transducer 710 (or transducers 726). Using the phased array 724 reduces the transducer area (HL) because the individual transducers 726 making up the array 724 are smaller than a single monolithic transducer (such as the transducer 710). In addition, or in other embodiments, each of the transducers 726 in the array 724 may be further segmented into multiple series-connected transducers (not shown). Such segmentation further reduces the transducer area (HL).

In addition, or in another embodiment, the performance of the AOD 610 is improved by providing it with an anamorphic (non-circular) shaped optical beam. The transducer height H appears in the denominator for both the transducer impedance Z and the device efficiency $\eta$. Thus, it is desirable that this dimension of the transducer 710 (or transducers 726) be reduced as much as is practical. However, to avoid cutting off portions of the laser beam 718, the AOD's height H should be more than the height of the laser beam 718. This sets a practical limit on how small H can be before the divergence of the optical beam becomes excessive.

Figure 8A:
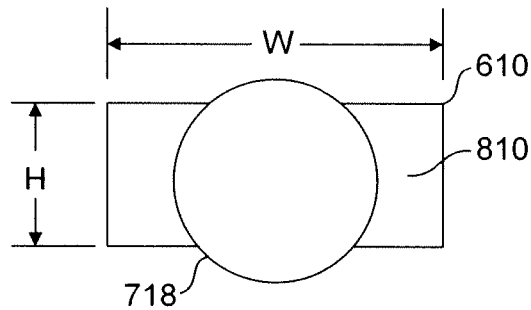
FIGS. 8A and 8B are schematic diagrams of a laser beam impinging upon a surface of an AOD according to certain embodiments.
Figure 8B:
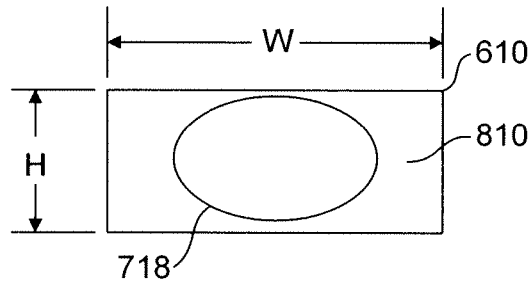

For example, FIGS. 8A and 8B are schematic diagrams of a laser beam 718 impinging upon a surface 810 of an AOD 610 that includes a reduced height H, as compared to FIGS. 7A and 7B. The surface 810 is defined by a width W and the height H. As shown in FIG. 8A, a substantially circular shaped laser beam may, in some embodiments, be larger than the surface 810. Thus, in the embodiment shown in FIG. 8B, the laser beam 718 comprises an anamorphic shape that is longer in the direction of the width W and shorter in the direction of the height H so as to fit within an area defined by the surface 810.

Further, the resolution N of the AOD 610 is proportional to the transit time $\tau$ of the acoustic wave 714 across the beam 718 in the dimension normal to the beam height H (see equation (3)). Thus, the anamorphic shaped beam 718 shown in FIG. 8B maintains a longer dimension in the direction of the width W. Accordingly, using the anamorphic shaped optical beam 718 within the AOD simultaneously achieves a high resolution N, a good efficiency $\eta$, and a higher transducer impedance.

In one embodiment, the RF drive power (e.g., the power level of the RF signal provided by the RF power driver 712) is kept at a constant level within requirements imposed by the thermal characteristics of the AOD 610. Thus, the RF power driver 712 and the AOD 610 are configured to maintain spot image quality and accuracy.

In addition, or in other embodiments, the system 600 calibrates out variations in diffraction efficiency and spot placement over the scan field. Nonlinear effects may cause variation in diffraction efficiency and focused spot location as a function of the frequency or amplitude of the RF power applied to the AOD 610. In one embodiment, the diffraction efficiency and/or spot placement may be characterized as a function of RF power and frequency. A look-up table or mathematical formula may be created, based on this characterization, to vary the RF power and frequency applied to the AOD 610 to achieve a desired spot placement and pulse energy. It is also possible to compensate for variations in diffraction efficiency by using an additional configurable attenuator such as an acousto-optic modulator (AOM).

Figure 9:
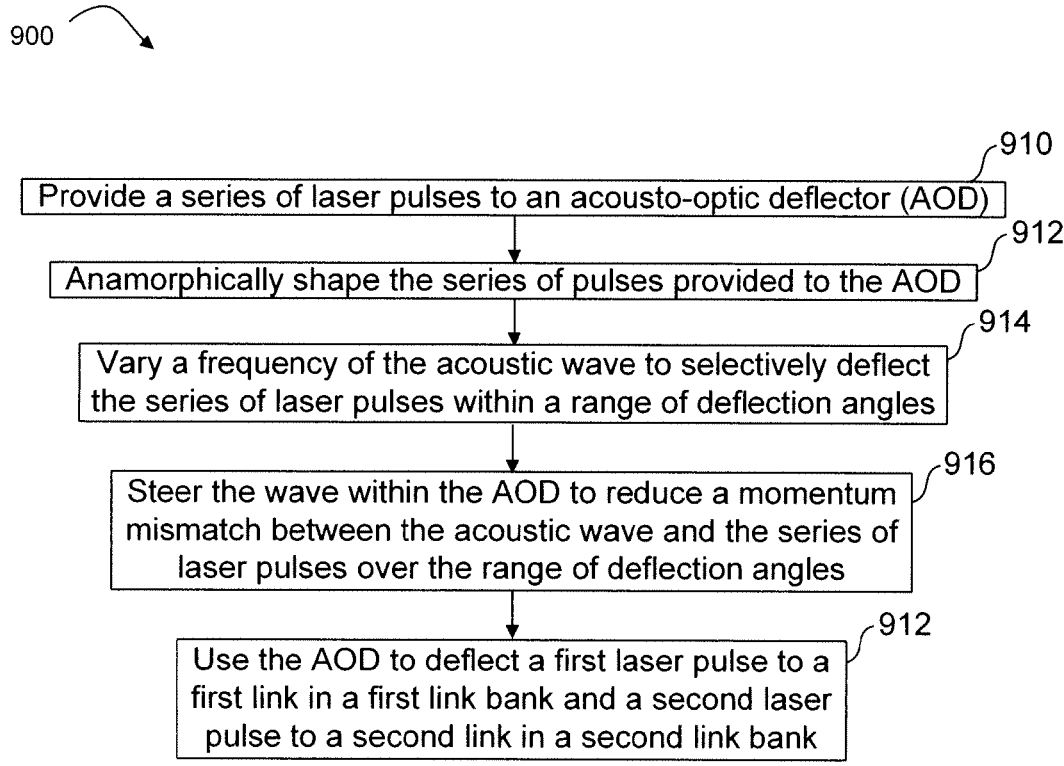
FIG. 9 is a flowchart of a process for using an optimized deflector to process laser-severable links arranged in a plurality of link banks on a semiconductor substrate according to one embodiment.

FIG. 9 is a flowchart of a process 900 for using an optimized deflector to process laser-severable links arranged in a plurality of link banks on a semiconductor substrate according to one embodiment. The process 900 includes providing 910 a series of laser pulses to an AOD. In one embodiment, the process 900 also includes anamorphically shaping 912 the series of pulses provided to the AOD. Thus, as discussed above, the height of the AOD may be reduced to improve resolution, efficiency and transducer impedance.

The process 900 further includes varying 914 a frequency of the acoustic wave to selectively deflect the series of laser pulses within a range of deflection angles. The process 900 further includes steering 916 the acoustic wave within the AOD to reduce a Bragg angle mismatch between the acoustic wave and the series of laser pulses over the range of deflection angles. For example, in one embodiment, the AOD includes a phased array of transducers where the respective phases are selected to reduce the Bragg angle mismatch as the frequency of the acoustic wave is varied. In another embodiment, for example, the AOD includes a stepped transducer geometrically configured to steer the acoustic wave as a function of the frequency so as to reduce the Bragg angle mismatch.

The process 900 further includes using the AOD to deflect a first laser pulse to a first link in a first link bank and a second laser pulse to a second link a second link bank. In one embodiment, the second laser pulse immediately follows the first laser pulse in the series of laser pulses.

Thus, the process 900 allows multiple link runs to be processed at the same time in a single pass of the semiconductor substrate. Further, processing multiple link banks in a single pass allows a higher number of generated laser pulses to be used from a high PRF laser with a slow motion stage, thereby increasing throughput. Also, as compared to multiple beam path systems that simultaneously provide two or more beam spots on a work surface, the process 900 serially provides a single beam spot on the work surface at any one time, thereby reducing or eliminating coherent crosstalk between beams directed to overlap at the work surface. The process 900 also allows for a simplified optics layout as compared to a multiple beam path system.

IV. Swath Processing

Figure 3:
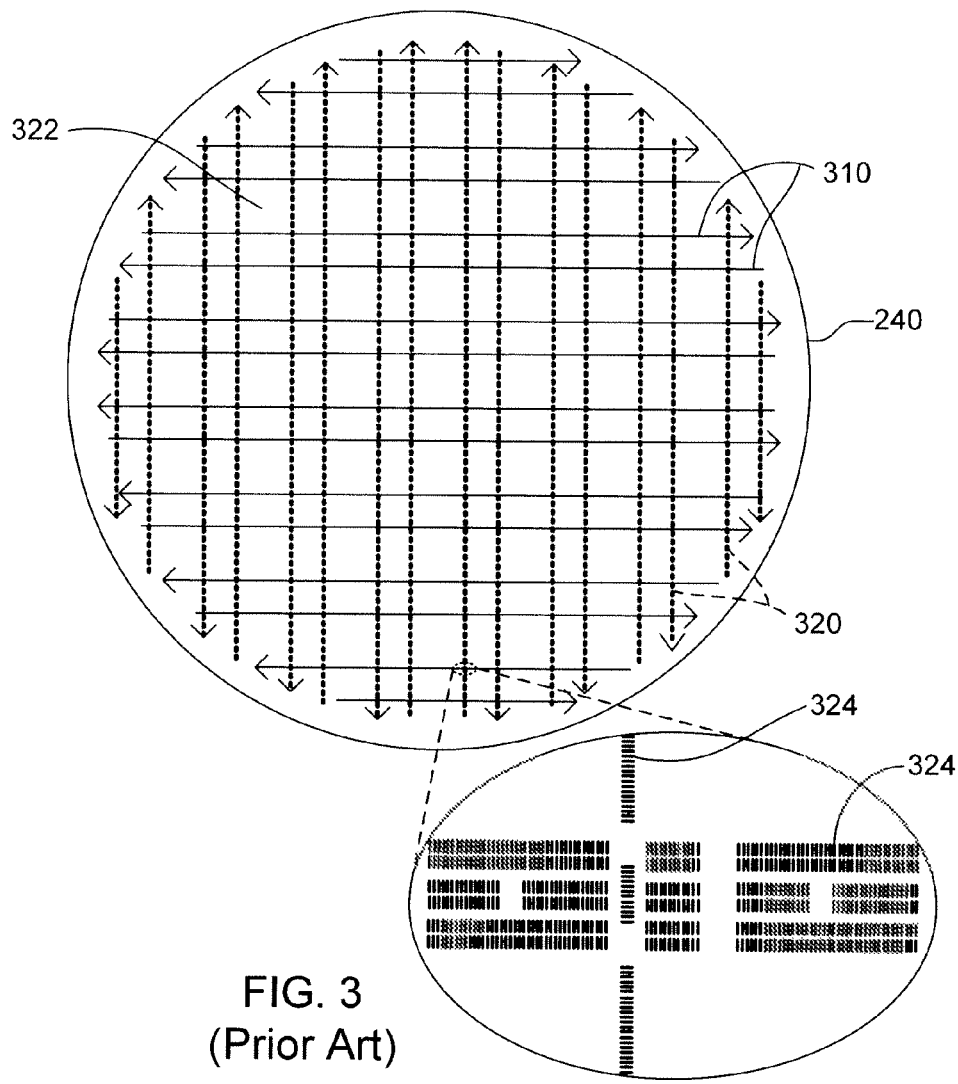
FIG. 3 is a schematic diagram of a prior art semiconductor wafer including a plurality of link runs.

Because links, link banks, and link runs are typically constrained to narrow strips that cover a small percentage of a wafer area (see FIG. 3), multiple laterally spaced links within a scan field of a focus lens may be efficiently processed as the scan field traverses across the wafer.

As discussed in detail below, different system configurations may be used to process multiple laterally spaced links as a scan field traverses across a wafer. For purposes of discussion, we refer again to the system 600 shown in FIG. 6. In one embodiment, the system 600 processes multiple link runs simultaneously in a "swath" or "strip" using a high speed beam deflecting device 610.

The system 600 may include a large processing window within the scan field of the focus lens 626. For example, in one embodiment, the processing window is approximately 50 μm wide by approximately 50 μm long (50 μm×50 μm). Of course, the disclosure herein is not limited to this size. For example, in other embodiments, the size of the processing window is in a range between approximately 50 μm×50 μm and approximately 150 μm×150 μm. In another embodiment, the size of the processing window is approximately 500 μm×500 μm. Further, the processing window need not be square. For example, round or rectangular processing windows may also be used.

A factor that may be considered in selecting the size of the processing window may be the cost of lenses with relatively larger scan fields. For example, a lens with a useful scanning field of approximately 50 μm may cost approximately $20,000, while a lens with a useful scanning field of approximately 500 μm may cost approximately $500,000. Thus, an analysis of increased throughput versus lens cost may identify an optimal size for a processing window.

As the processing window is continuously advanced or stepped across the workpiece 618, the high speed deflecting device 610 is used to efficiently deliver laser pulses to links in the various link runs that pass through the processing window. To efficiently process links in a large processing window scanning across the workpiece 618 at a desired velocity, it may be necessary in certain embodiments to use a very high speed technology for redirecting the pulsed laser beam 612 from one processing spot on the workpiece 618 to another processing spot on the workpiece 618.

In one embodiment, the speed of the high speed deflecting device 610 is approximately on the time scale of the laser pulse period. For example, when using a laser 614 with a 100 kHz PRF, the high speed deflecting device 610 has a switching time on the order of approximately 10 μseconds. Many mechanical actuators, such as piezoelectrically actuated mirrors or galvanometers, may have insufficient bandwidth and/or response time to operate as an effective steering mechanism. Thus, in certain embodiments, the system 600 uses AOD and/or EOD type beam steering devices to redirect the beam 612 to different locations on the workpiece 618 within the processing field on this time scale. In one embodiment, the high speed deflecting device 610 comprises the optimized AOD 610 discussed above in relation to FIGS. 7A and 7B.

Figure 10:
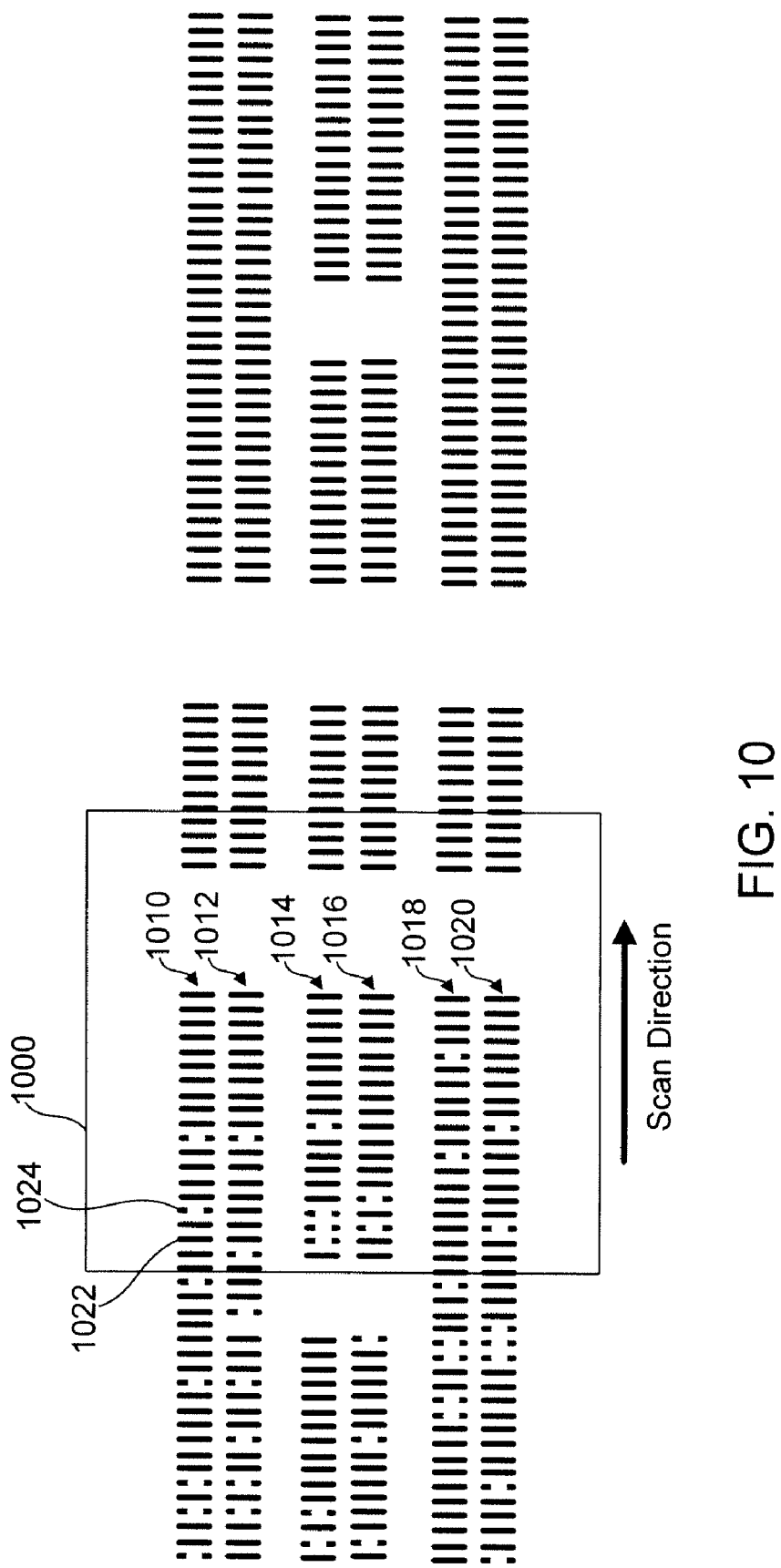
FIG. 10 is a schematic diagram illustrating a processing window scanning across a plurality of laterally spaced link banks according to one embodiment.

FIG. 10 is a schematic diagram illustrating a processing window 1000 scanning across a plurality of laterally spaced link banks 1010, 1012, 1014, 1016, 1018, 1020 according to one embodiment. Each link bank 1010, 1012, 1014, 1016, 1018, 1020 includes a plurality of links 1022 that are not severed and a plurality of links 1024 that are severed by a series of laser pulses as the processing window 1000 scans across the plurality of link banks 1010, 1012, 1014, 1016, 1018, 1020.

In one embodiment, a laser processing system 600 is configured to sever any link 1022, 1024 within the moving processing window 1000. Thus, rather than using six individual link runs to process the six link banks 1010, 1012, 1014, 1016, 1018, 1020 included in the example shown in FIG. 10, the system 600 processes all six link banks 1010, 1012, 1014, 1016, 1018, 1020 in a single pass, greatly improving system throughput. In one embodiment, for example, a system including a 100 kHz laser provided through a single beam path, a 50 μm×50 μm processing window, and a low performance stage (e.g., 1 G accelerations per axis and 20 ms settle times), may have an increased throughput that is two to three times that of conventional link processing systems. Such a system would be competitive with a dual-beam system including a high PRF laser (e.g., 300 kHz) and a high performance stage (e.g., 1 m/second link runs, 5 G accelerations, and 0.001 second settle times). It may be significantly easier and cheaper to build the system having the lower performance stage. Further, the single beam system may be easier and cheaper to build than the dual-beam system.

In one embodiment, the processing window 1000 scans across the plurality of link banks 1010, 1012, 1014, 1016, 1018, 1020 in a substantially continuous motion as the plurality of links 1024 are severed. In another embodiment, the processing window 1000 steps across the plurality of link banks 1010, 1012, 1014, 1016, 1018, 1020 in a series of discrete movements. In one such embodiment, the processing window comprises two mutually exclusive sets of links 1022, 1024 between each step or hop. Thus, the system 600 may process a first set of links 1022, 1024 in both on-axis and cross-axis directions within the processing window 1000 at a first location before the processing window 1000 moves to a second location that includes a second (and different) set of links. In another embodiment, the processing window 1000 takes smaller steps in the scan direction such that when one group (e.g., one column) of links 1022, 1024 corresponding to respective link banks 1010, 1012, 1014, 1016, 1018, 1020 enters the scanning window 1000 during a step, another group of links 1022, 1024 exits the scanning window 1000. Thus, the system 600 processes a group or column of laterally spaced links 1022, 1024 in different link banks 1010, 1012, 1014, 1016, 1018, 1020 between each step.

An artisan will understand from the disclosure herein that, depending on the relative sizes of the processing window 1000 and the link banks 1010, 1012, 1014, 1016, 1018, 1020, the system 600 may process more than six link banks in a single pass. Further, the system 600 may process less than six link banks in a single pass, including, for example, processing a single link bank in a single pass.

An artisan will also understand from the disclosure herein that the system 600 is not limited to processing substantially parallel, laterally spaced link banks 1010, 1012, 1014, 1016, 1018, 1020 within the processing window 1000. Indeed, the links 1022, 1024 passing through the processing window 1000 may be arranged in any pattern. The severed links 1024 may also be severed in any sequence. Further, while FIG. 10 shows a uniform scan direction in the X-direction (horizontal), the scan direction may also be in the Y-direction (vertical), a combination of X and Y directions, and/or a random pattern around the XY plane of a wafer. In one embodiment, the scan direction is selected so as to optimize throughput.

Figure 11:
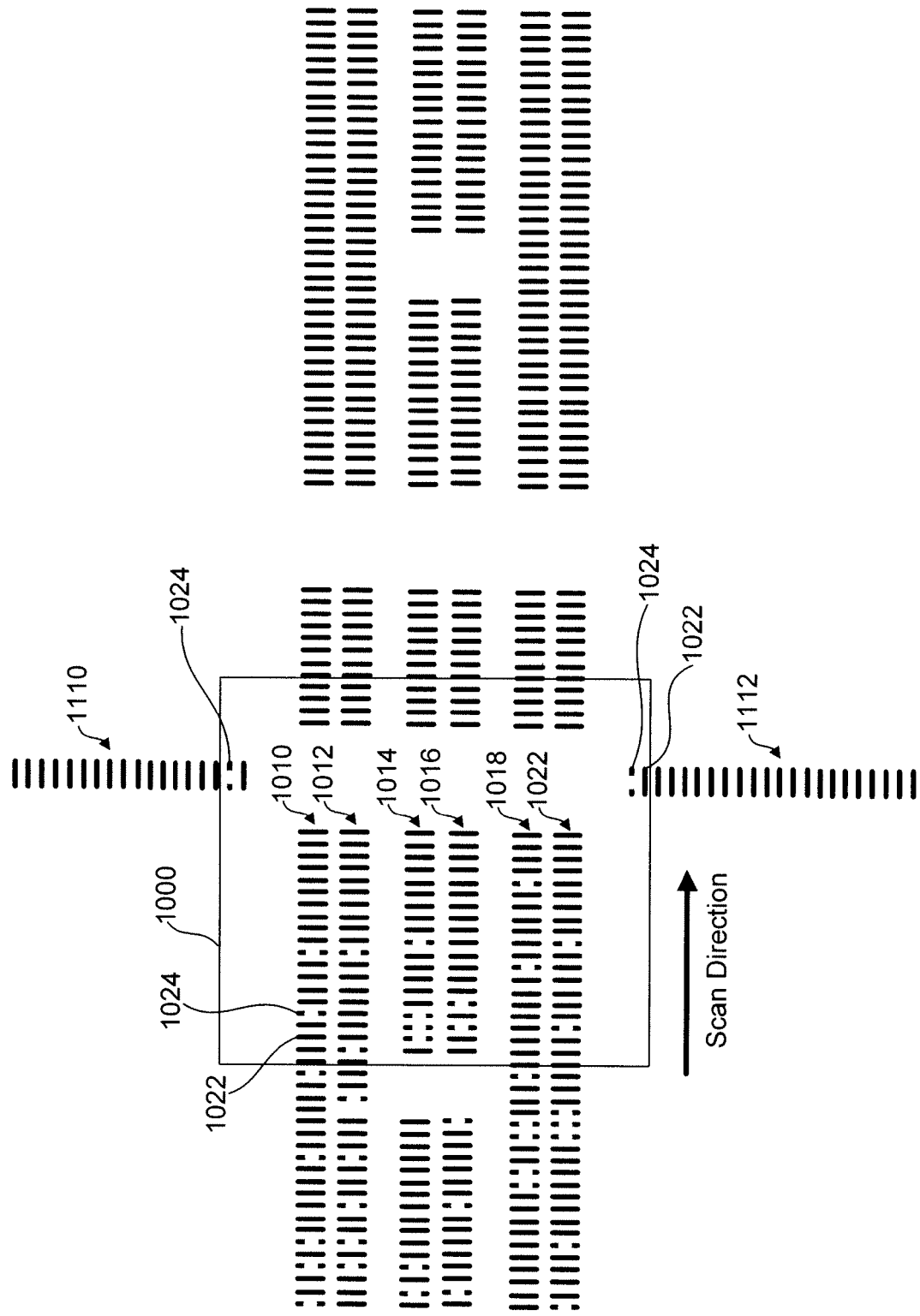
FIG. 11 is a schematic diagram illustrating a processing window scanning across a plurality of laterally spaced link banks extending along an X-axis and a plurality of link banks extending along a Y-axis according to one embodiment.

For example, FIG. 11 is a schematic diagram illustrating a processing window 1000 scanning across a plurality of laterally spaced link banks 1010, 1012, 1014, 1016, 1018, 1020 extending along an X-axis and a plurality of link banks 1110, 1112 extending along a Y-axis according to one embodiment. In a single pass of the processing window 1000 over the laterally spaced link banks 1010, 1012, 1014, 1016, 1018, 1020 extending along the X-axis, the processing window 1000 also passes over at least a portion of the links 1022, 1024 in the plurality of link banks 1110, 1112 extending along the Y-axis. Again, as shown in FIG. 11, the system 600 may selectively sever any of the links 1022, 1024 passing through the processing window 1000.

In one embodiment, the system 600 sorts and orders the sequence of link blows within the processing window 1000 so as to maximize or increase throughput. To achieve this maximized or increased throughput, the system 600 also calculates a stage velocity that is compatible with the size of the processing window 1000, the number of links 1022, 1024 within the processing window 1000 to be blown at any given time, and the sequence of link blows. In one such embodiment, the system 600 selects a stage velocity so as to reduce the number of blocked pulses. The stage velocity may also be selected to ensure that every link intended to be blown is blown in a single pass of the processing window 1000. In one embodiment, the stage velocity may be constant.

In other embodiments, the stage velocity may vary based on the number of links 1024 to be blown currently passing through the processing window 1000. For example, when fewer links 1024 to be blown are passing through the processing window 1000, the system 600 may increase the stage velocity. When more links 1022, 1024 to be blown are passing through the processing window 1000, the system 600 may decrease the stage velocity.

In one embodiment, a maximum stage velocity $V_{SMAX}$ is determined by finding the maximum number of links ($N_{MAX}$) within the processing window 1000 over a group of link runs. For example, the maximum stage velocity $V_{SMAX}$ may be set to the width ($AOD_{width}$) of the processing window 1000 multiplied by the PRF divided by $N_{MAX}$. This provides a good estimate for the maximum stage velocity $V_{SMAX}$. However, in one embodiment, the system 600 takes into account possible "queueing" of the links 1022, 1024 in the processing window 1000, which provides a buffer for unprocessed links over short sections of the link runs when the velocity exceeds the above limit. Depending on the density of the link runs, such queueing may increase the stage velocity in a range between approximately 50% and approximately 100%. This improvement may be diluted in some embodiments by acceleration/deceleration times and overhead. In one embodiment, using queueing to determine the maximum stage velocity $V_{SMAX}$ is an iterative process wherein an overflow of a "link queue" becomes very non-linear as a true maximum velocity is approached. In such embodiments, more linearity may be introduced by, for example, filtering the link density, calculating a "link flow" for a given velocity, and calculating an allowable "accumulation" in the processing window 1000 given a maximum "processing flow" (PRF multiplied by the link pitch).

To sever any link 1024 within the moving processing window 1000, the positioning accuracy of the AOD 610 shown in FIG. 6 is sufficiently small so as to maintain system accuracy over the entire processing window 1000. Present high numeric aperture lenses have a scan field of approximately 50 μm. Further, it may be desirable to have a system link blow accuracy that is better than mean plus 3 sigma<0.18 μm. If, for example, the AOD 610 contributes approximately 20 nm of system inaccuracy to an error budget, then the AOD 610 according to one embodiment has a positioning accuracy of approximately 1 part in 2500.

V. Swath Processing Modes

In one embodiment, the system 600 processes the individual links 1024 in the processing window 1000 using a single pulse to blow each link 1024. The AOD 610 quickly redirects the position of the focused link pulses to links 1024 within the processing window 1000 between two sequential laser pulses as the processing window 1000 travels in the scan direction. While a conventional link processing system may block approximately one-half to approximately 99% of the pulses produced by a very high PRF laser, the system 600 may use most or all of the pulses. Thus, throughput may be greatly increased without moving the workpiece 618 faster.

In addition, or in another embodiment, the system 600 may process a single location on the workpiece 618 with two or more pulses before using the AOD 610 to direct subsequent pulses to other locations on the workpiece 618. The system 600 may provide ten, for example, lower energy pulses to a link 1024 before redirecting the laser beam to a different location on the workpiece 618. Thus, the system 600 provides an effective way of directing pulses produced at a very high PRF (e.g., in a range between approximately 1 MHz and approximately 100 MHz) to target desired links 1024 with many blows.

If the processing window 1000 moves continuously with respect to the workpiece 618, the AOD 610 may be used to track according to one embodiment so as to maintain a stationary relationship between a focused spot location and a link position while one or more pulses are delivered to the link 1024. Tracking may also be used to maintain a stationary relationship with a plurality of laterally spaced links.

In one embodiment, switching times between locations on the workpiece 618 are less than one laser pulse period. In another embodiment, the switching time is on the order of the laser pulse period. In other embodiments, the switching time is longer than the switching pulse period. Thus, the laser 614 is effectively used if, for example, the system 600 processes links 1024 with ten laser pulses and switches from one link to the next in three or four laser pulse periods.

Rather than delivering all ten pulses (in the example above) to a single link 1022, 1024 before switching to a new location (e.g., as the processing window 1000 advances in the scan direction shown in FIGS. 10 and 11), two or more of the pulses may be delivered to two or more laterally spaced links 1022, 1024 (e.g., spaced perpendicular to the scan direction). For example, it may be desirable to deliver a single pulse to each of six laterally spaced links 1022 (one in each of the link banks 1010, 1012, 1014, 1016, 1018, 1020 shown in FIG. 10). Thus, the AOD 610 may deflect six sequential laser pulses to the six laterally spaced links 1022 before shifting the processing window 1000 to a new location.

Figure 12A:
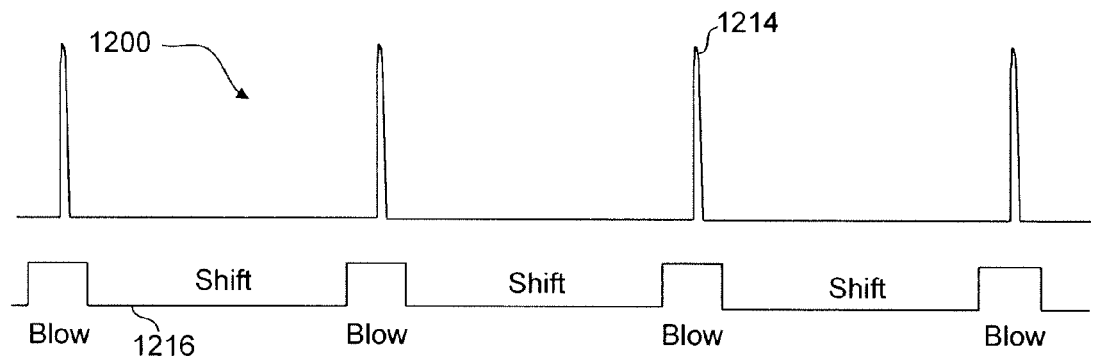
FIGS. 12A-12C are timing diagrams illustrating a series of laser pulses in relation to respective repositioning profiles according to certain embodiments.
Figure 12B:
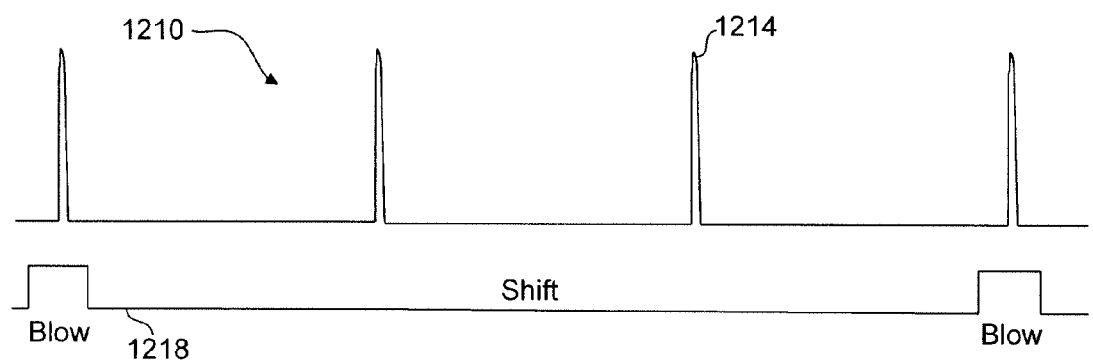
Figure 12C:
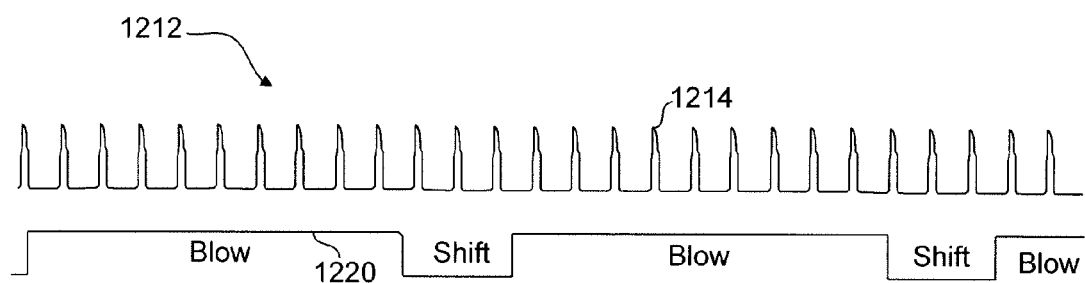

FIGS. 12A-12C are timing diagrams 1200, 1210, 1212 illustrating a series of laser pulses 1214 in relation to respective repositioning profiles 1216, 1218, 1220 according to certain embodiments. An artisan will understand from the disclosure herein that the timing diagrams 1200, 1210, 1212 shown in FIGS. 12A-12C are provided by way of example only and that any combination of pulses delivered per link and pulse periods used to shift between links may be used. In the embodiment shown in FIG. 12A, a single laser pulse is delivered to a link during a blow period. An AOD or a high speed beam deflector (not shown), for example, is then shifted or repositioned between each pulse during a shift period. Thus, in this example, each laser pulse in the series of laser pulses 1214 is delivered to a different link.

In the embodiment shown in FIG. 12B, the AOD or high speed beam deflector uses more time, as compared to the example in FIG. 12A, to shift between each blow period. Specifically, after a first pulse is delivered to a first link, the AOD or high speed beam deflector shifts during three pulse periods before a second pulse is delivered to a second link. As discussed below, a switch (e.g., an additional AOD and a beam dump) may be used block the unused laser pulses from reaching the surface of the workpiece during the shift period.

In the embodiment shown in FIG. 12C, a first plurality of pulses (nine shown) are delivered to a first link during a first blow period, the AOD or high speed beam deflector shifts during a few pulse periods (approximately three shown), and a second plurality of pulses are delivered to a second link during a second blow period. In one embodiment, however, two or more of the first (and/or second) plurality of pulses may distributed among a plurality of laterally spaced links during the first (and/or second) blow periods using a high speed deflection device such as the AOD 610 discussed above. Thus, pulses may be efficiently distributed so as to utilize as many of the pulses in the series of laser pulses 1214 as possible. In one embodiment, the number of pulses used increases by more than approximately 1% as compared to pulses utilized by conventional link processing systems.

Coherent crosstalk may be a problem for laser spots directed to process the same target on the work surface in areas that either fully or partially overlap, laser spots that overlap separate targets on the work surface such that any portion of the beam (e.g., Gaussian tails) overlap, or laser spots that overlap at a detector such as a pulse energy or reflected pulse energy detector. When Gaussian tails of different laser spots overlap, for example, crosstalk and interference in the region between two nearby structures (e.g., links) may result in damage caused by undesirably high optical energy levels. Thus, in the embodiments discussed above, a single laser spot is incident within a processing window on a workpiece at a time. Two sequential laser spots configured to spatially overlap on the workpiece do not interfere with each other, thereby reducing or eliminating coherent crosstalk. However, in other embodiments, multiple spots may be incident within the processing window on the workpiece at the same time. For example, two or more laser beams may be provided through two or more beam paths.

VI. Error Correction

In one embodiment, the AOD 610 shown in FIG. 6 that is used to selectively provide laser pulses to laterally spaced links is also used to shift the position of a focused laser spot to correct for relative position errors that occur in a motion stage. For example, if a planar XY motion stage is used to position a wafer under a focused laser spot, then beam steering may be used to compensate for residual XY stage tracking error (e.g., the instantaneous difference between desired trajectory and actual trajectory).

In addition, or in another embodiment, the AOD 610 may be used to correct for other types of system errors or disturbances. For example, motion of the focus lens 626 may be sensed so that the AOD 610 may correct for any corresponding motion of the spot at the workpiece 618. As another example, the AOD 610 may compensate for beam pointing errors such as sensed inaccuracy in the pointing stability of the laser rail. The AOD 610 may also compensate for thermal drift.

In one embodiment, the AOD 610 is driven with closed-loop sensing and feedback correction. In one such embodiment, the AOD 610 deflects unwanted or unused pulses to a beam dump that includes a position sensitive detector (PSD) or quad cell configured to measure the position of the unused pulses. In addition, or in other embodiments, all pulses may be sensed for position and/or energy feedback, not just the dumped pulses. Thus, thermal drift and/or changes in the AOD's calibration (e.g., calibration to account for thermal drift during particular RF duty cycles) may be detected and corrected by adjusting the amount of deflection provided by the AOD 610.

In another embodiment, one or more additional laser beams may be passed through the AOD 610 to determine how they are deflected. For example, in addition to the laser beam used to sever links, a continuous-wave (CW) laser such as a helium neon laser may be positioned so that its beam passes through the AOD 610. At least a portion of the resulting CW beam may then be directed to a PSD or quad cell for detecting drift and/or to provide feedback to the AOD 610.

VII. Example System Embodiments

As discussed above, FIG. 6 illustrates one embodiment of a laser processing system 600. However, other system configurations and components will occur to an artisan upon reading the disclosure herein. For example, FIGS. 13-17 provide additional example embodiments discussed below.

In FIGS. 6 and 13-17 a wide variety of lasers 614 and different laser pulse properties may be selected to favorably improve the processing of semiconductor link structures. These laser sources 614 may include solid state lasers, such as diode-pumped q-switched solid state lasers, including lasers comprising rare-earth-doped lasants such as $Nd:YVO_4$, Nd:YLF, and Nd:YAG and vibronic lasants such as alexandrite, Cr:LiSAF, and Cr:LiCAF. The fundamental wavelength output of these lasers 614 may be converted to harmonic wavelengths through the well-known process of nonlinear harmonic conversion.

These laser sources 614 may further include diode-pumped mode-locked solid state lasers, such as, SESAM mode-locked $Nd:YVO_4$ lasers capable of producing pulsed picosecond laser output. Mode-locked solid state lasers may include oscillator-regenerative amplifier and oscillator-power amplifier configurations. The fundamental wavelength output of these lasers may be converted to harmonic wavelengths through the well-known process of nonlinear harmonic conversion. The laser sources 614 may also include chirped pulse amplification laser systems for the generation of femtosecond (fs) laser output or may alternatively include other pulse stretching and compression optics well-known to the art for the purpose of generating pulsed femtosecond laser output.

These laser sources 614 may further include pulsed rare earth-doped solid core fiber lasers and pulsed rare-earth-doped photonic crystal fiber lasers. Pulsed rare-earth-doped fiber lasers may include q-switched and oscillator-amplifier configurations. Further, a wide variety of oscillators may be employed, including broad area semiconductor lasers, single-frequency semiconductor lasers, light emitting diodes, q-switched solid state lasers, and fiber lasers. The fundamental wavelength output of these lasers may be converted to harmonic wavelengths through the well-known process of nonlinear harmonic conversion.

Additional laser sources 614 may further include semiconductor lasers, gas lasers, including $CO_2$ and argon-ion lasers, and excimer lasers.

The laser sources 614 may produce a wide range of wavelengths, from about 150 nm to about 11,000 nm. Depending on the laser sources 614 employed, pulse widths ranging from about 10 fs to greater than about 1 µs and PRFs ranging from pulse-on-demand to greater than about 100 MHz may be produced. Depending on the laser sources 614 employed, the pulse shape, energy per pulse or output power, pulsewidth, polarization, and/or wavelength may be tunable or selectable.

Ultra fast lasers, which deliver numerous pulses in rapid succession to process a link, may also be used. In addition to use in the system like any other laser source, the generating and blocking of pulses in a system employing an ultra fast laser can be coordinated to allow different pulse sequences to be delivered down each of multiple beam paths (see FIGS. 15-17). For example, more or fewer pulses may be permitted to pass down one of the beam paths for delivery to a link. Pulses may also be delivered in bursts or delivered alternating down the different beam paths. An offset or adjustment in the laser spot location relative to the workpiece in one or more of the multiple beam paths can also be created by allowing a temporally different set of laser pulses to reach the target links.

Figure 13:
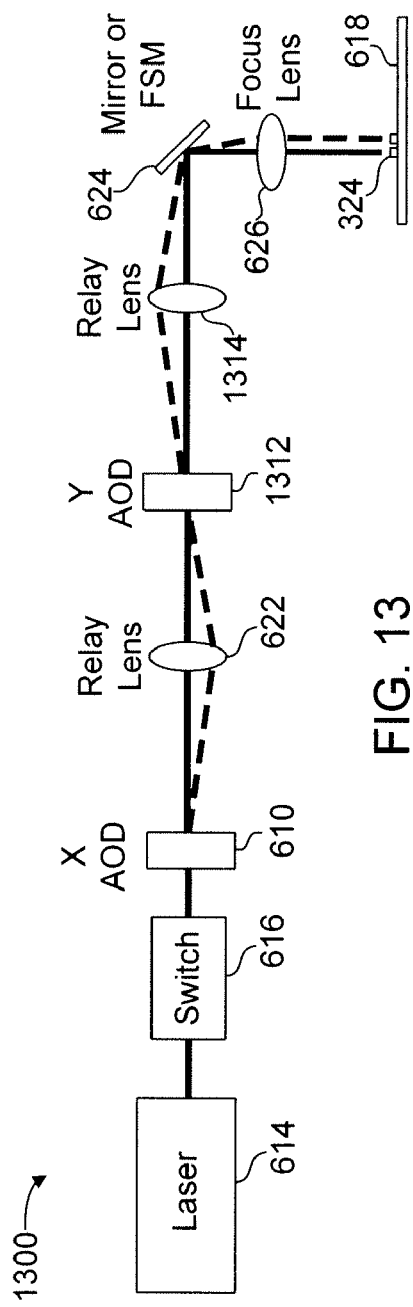
FIG. 13 is a schematic diagram of a laser processing system comprising two deflection devices according to one embodiment.

FIG. 13 is a schematic diagram of a laser processing system 1300 comprising two deflection devices according to one embodiment. The system 1300 includes the laser 614, switch 616, AOD 610, relay lens 622, mirror 624, and focus lens 626 discussed in relation to FIG. 6. However, the system 1300 also includes another AOD 1312 and another relay lens 1314 in the beam path.

In one embodiment, the AOD 610 is configured to deflect the laser beam in the X-direction and the AOD 1312 is configured to deflect the laser beam in the Y-direction. The relay lens 622 images the laser beam from the AOD 610 to the AOD 1312. The relay lens 1314 images the laser beam from the AOD 1312 to the mirror 624. Thus, the system 1300 may redirect laser pulses in two directions. In one embodiment, however, the AOD 610 shown in FIG. 6 comprises a single device capable of deflecting the laser beam in two directions.

Figure 14:
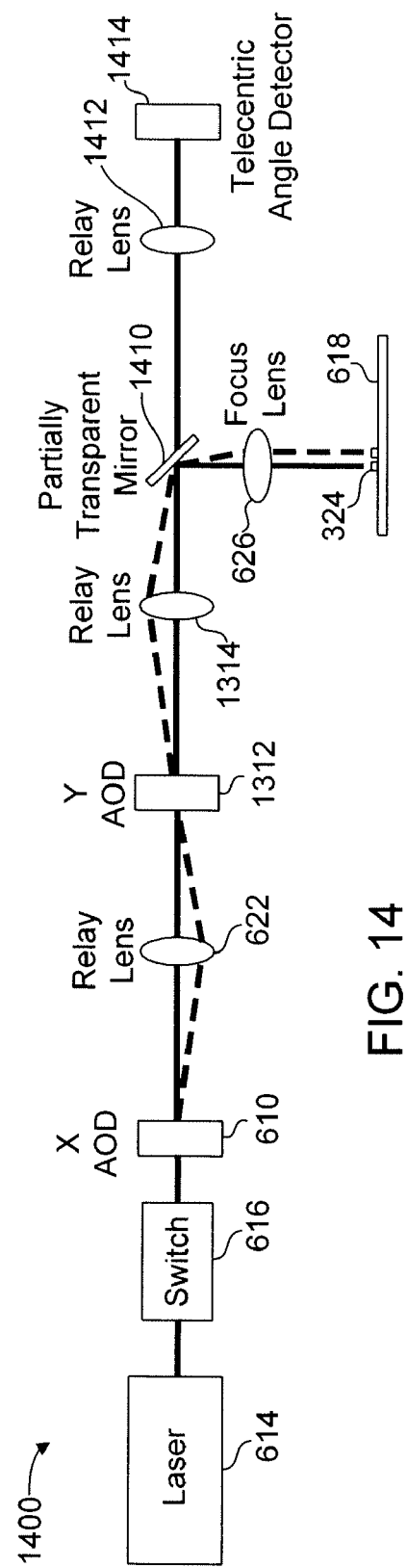
FIG. 14 is a schematic diagram of a laser processing system including a telecentric angle detector according to one embodiment.

FIG. 14 is a schematic diagram of a laser processing system 1400 including a telecentric angle detector 1414 according to one embodiment. In this embodiment, a partially transparent mirror 1410 directs a portion of the laser beam to the focus lens 626 and a portion of the laser beam to the telecentric angle detector 1414 through an additional relay lens 1412. The telecentric angle detector 1414 may include a quad cell, a PSD, or a camera detector configured to detect beam angle. As discussed above, the telecentric angle detector 1414 may be used to provide feedback to one or both of the AODs 610, 1312 for error correction and/or calibration.

Figure 15:
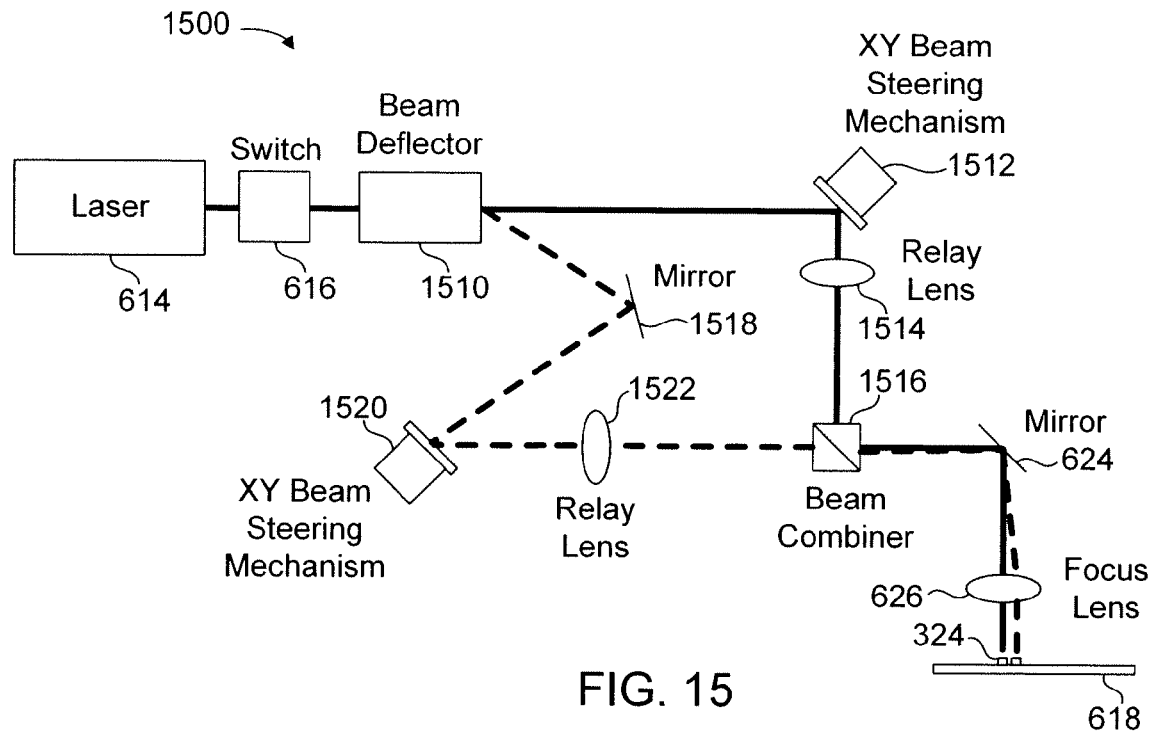
FIG. 15 is a schematic diagram of dual-beam path laser processing system according to one embodiment.

Although the systems 600, 1300, 1400 shown respectively in FIGS. 6, 13, 14 include single beam paths, multiple beam path systems may also be used. For example, FIG. 15 is a schematic diagram of dual-beam path laser processing system 1500 according to one embodiment. In this embodiment, a high speed beam deflector 1510 directs the laser beam to a first optical path including a first XY beam steering mechanism 1512, a relay lens 1514, and a beam combiner 1516. The beam deflector 1510 also directs the laser beam to a second optical path including a mirror 1518, a second XY beam steering mechanism 1520, a relay lens 1522, and the beam combiner 1516. The first optical path and the second optical path result in configurable link blow locations. The configuration may be static or changed with a beam deflection technology such as piezoelectric fast steering mirrors, multiple-beam actuators or other quick beam actuators. The configuration may also be changed with slowly moving configurable optics elements such as motorized mirrors and tilt plates.

The embodiment shown in FIG. 15 may be desirable, for example, when the high speed beam deflector 1510 can be used to separate pulses, but not for complete beam steering. For example, beam steering with an AOD may provide steering in a single direction (e.g., X-axis). By having two optical paths, deflection provided by an AOD (which may also be used for the switch 616) separates the series of pulses between the first optical path and the second optical path. Then, configurable optics in each path direct the pulses to desired blow locations on the workpiece 618. In one embodiment, the system 1500 provides the pulses serially such that one and only one beam spot is on the workpiece 618 at a time. In another embodiment, the system 1500 provides two beam spots (e.g., one from each path) on the workpiece 618 at the same time.

Figure 16:
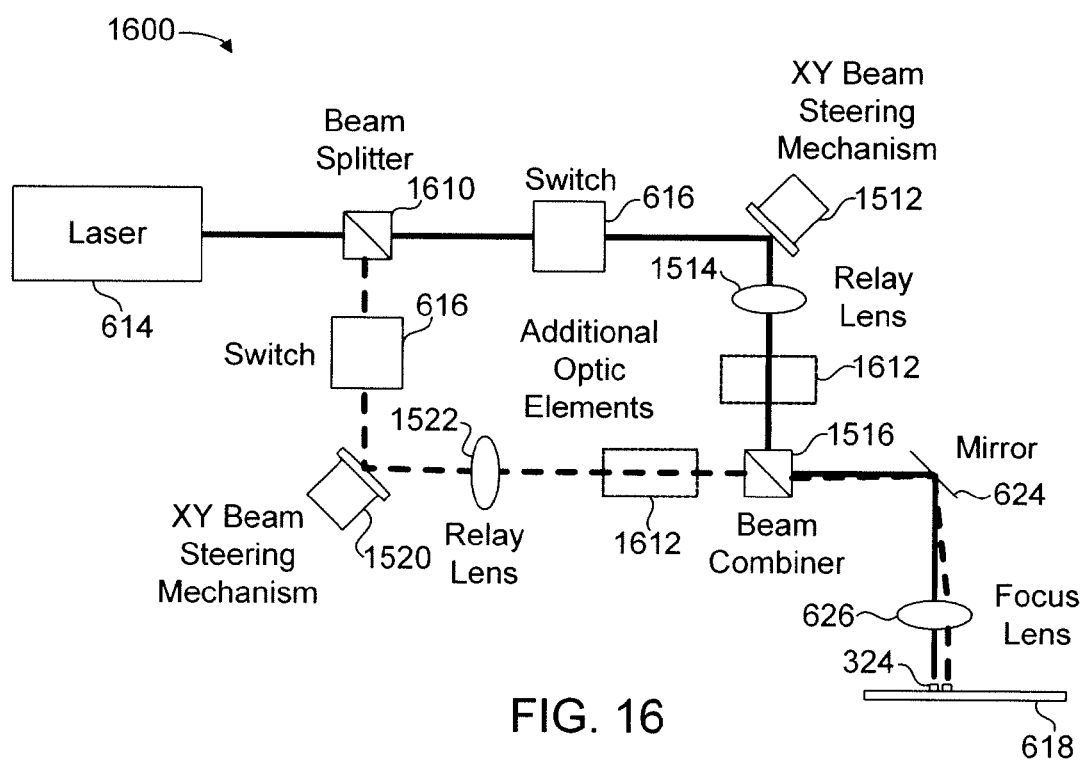
FIG. 16 is a schematic diagram of a dual-path laser processing system according to another embodiment.

FIG. 16 is a schematic diagram of a dual-path laser processing system 1600 according to another embodiment. The system 1600 includes a beam splitter 1610 configured to direct a portion of the laser beam down a first optical path including a first switch 616, a first XY beam steering mechanism 1512, a first relay lens 1514, additional optic elements 1612, if any, and a beam combiner 1516. The beam splitter 1610 also directs a portion of the laser beam down a second optical path including a second switch 616, a second XY beam steering mechanism 1520, a second relay lens 1522, additional optic elements 1612, if any, and the beam combiner 1516. The beam splitter 1610 may include bulk optics such as polarizing beam splitter cubes or partially reflecting mirrors. AODs, EODs, and switchable liquid crystal display (LCD) polarizers may also be configured and driven to perform beam splitting. Alternatively, fiber optic couplers may serve as a beam splitter in fiber-optic implementations.

The additional optic elements 1612 in each path, which are optional, may be included to shape or change the optical properties of the beams and may include, for example, polarizers, polarization modifiers, faraday isolators, spatial beam profile modifiers, temporal beam profile modifiers, frequency shifters, frequency-multiplying optics, attenuators, pulse amplifiers, mode-selecting optics, beam expanders, lenses, and relay lenses. Additional optic elements may also include delay lines that include an extra optical path distance, folded optical paths, and fiber-optic delay lines.

In one embodiment, the system 1600 is operated such that only one spot at a time is allowed on the workpiece 618. In another embodiment, the system 1600 is operated such that two beam spots are on the workpiece 618 at the same time. In one such embodiment, the two spots are not overlapped to avoid excessive or uniform thermal effects. An artisan will recognize that the system 1600 may be generalized for more than two beam paths.

Figure 17:
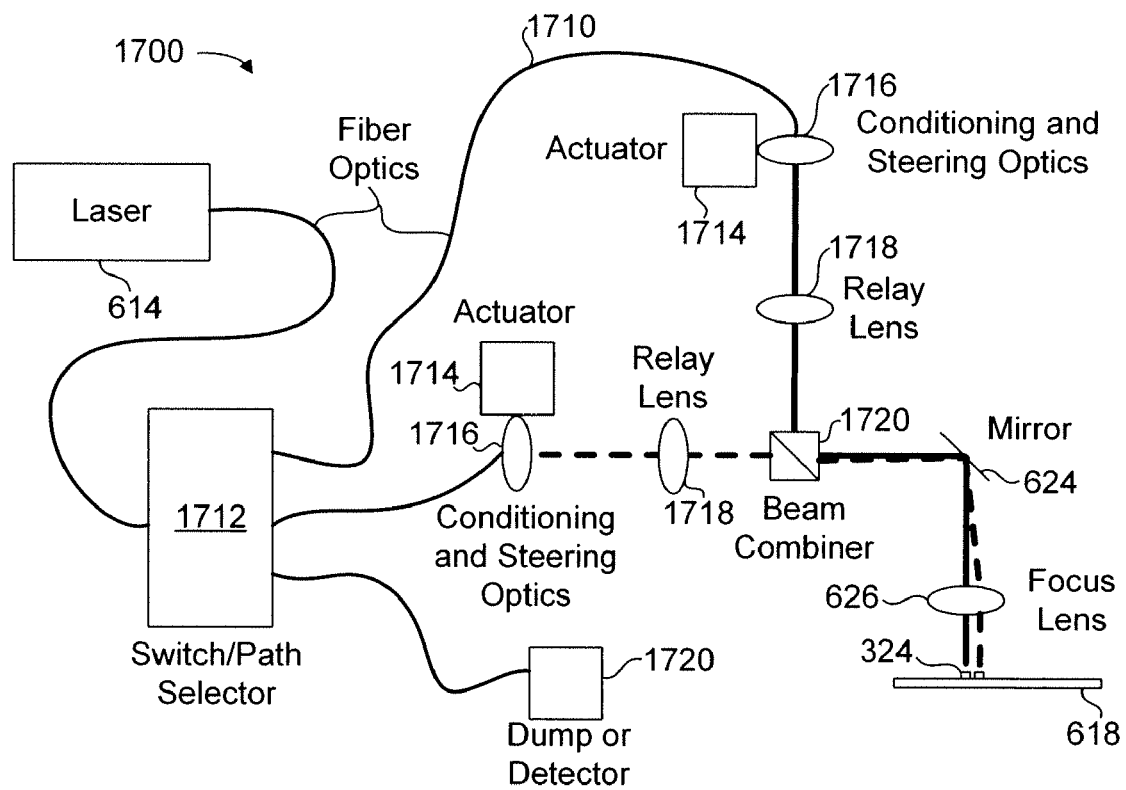
FIG. 17 is a schematic diagram of a fiber optic laser processing system according to one embodiment.

FIG. 17 is a schematic diagram of a fiber optic laser processing system 1700 according to one embodiment. In this embodiment, a laser 614 is coupled to a fiber optic cable 1710 that provides a series of laser pulses to a fiber optic switch 1712. The switch 1712 selectively directs laser pulses down fiber optic 1710 beam paths. In this example, both a first and a second beam path include an actuator 1714 coupled to conditioning and steering optics 1716, and a relay lens 1718. A third beam path may include, for example, an optical device 1720 such as a beam dump or detector.

The first and second beam paths include a shared beam combiner 1720 and are configured to provide laser pulses to two different spot locations on the workpiece 618. The actuated beam conditioning optics 1716 are configured to change the position and slope of a conditioned beam emitted from the fiber optics 1710, combine them, and deliver them to the workpiece 618.

An artisan will recognize from the disclosure herein numerous other embodiments of laser systems that may be used for single beam path and split beam path processing of a plurality of laterally spaced link runs in a single pass. Certain embodiments, for example, may include hybrid systems that use a deflector element to make a two-path system into an effective serialized four spot system. As with other dual-beam systems, different configurations of relative spot locations may be implemented or commanded. Spots may fully or partially overlap, have an on-axis spacing, a cross-axis spacing, or both an on-axis and cross-axis spacing.

It will be obvious to those having skill in the art that many changes may be made to the details of the above-described embodiments without departing from the underlying principles of the invention. The scope of the present invention should, therefore, be determined only by the following claims.

What is claimed is:

1. A method for processing structures on or within a semiconductor substrate, the method comprising:
   providing a series of laser pulses to a first deflector configured to selectively deflect the laser pulses within a processing window;
   scanning the processing window over the semiconductor substrate, a plurality of laterally spaced rows of structures simultaneously passing through the processing window as the processing window is scanned; and
   selectively deflecting the series of laser pulses among the plurality of laterally spaced rows within the processing window,
   wherein, as the processing window is scanned over the semiconductor substrate in a scan direction, a first laser pulse is deflected to a first row of the laterally spaced rows and a second laser pulse is deflected to a second row of the laterally spaced rows, the second laser pulse being subsequent to the first laser pulse in the series of laser pulses,
   wherein, with respect to the scan direction, the second laser pulse is deflected in a reverse direction and laterally, and
   wherein the second laser pulse is deflected to the second row within 100 μs after the first laser pulse is deflected to the first row.

2. The method of claim 1, wherein the first laser pulse and the second laser pulse are consecutive laser pulses in the series of laser pulses.

3. The method of claim 1, wherein the first laser pulse is deflected to a first structure in the first row and the second laser pulse is deflected to a second structure in the second row, and wherein the first structure and the second structure are laterally aligned such that a straight line passes through both the first structure and the second structure, the straight line being perpendicular to a scanning direction of the processing window.

4. The method of claim 1, wherein the first deflector is configured to deflect the series of laser pulses in a first direction and in a second direction, wherein the first direction is substantially perpendicular to a scanning direction of the processing window, and wherein the second direction is substantially parallel to the scanning direction.

5. The method of claim 1, wherein the first deflector is selected from a group comprising an acousto-optic deflector and an electro-optic deflector.

6. The method of claim 1, wherein scanning the processing window comprises continuously moving the processing window with respect to the semiconductor substrate from a first end of the plurality of laterally spaced rows to a second end of the laterally spaced rows.

7. The method of claim 6, wherein continuously moving the processing window comprises moving the processing window with respect to the semiconductor substrate at a constant velocity.

8. The method of claim 6, wherein continuously moving the processing window comprises varying a scanning velocity based on a changing number of structures in the laterally spaced rows currently passing through the processing window.

9. The method of claim 8, wherein varying the scanning velocity comprises accelerating the scanning velocity when one or more of the laterally spaced rows comprises a relative gap between successive structures.

10. The method of claim 1, wherein scanning the processing window comprises stepping the processing window between a first location relative to the semiconductor substrate and a second location relative to the semiconductor substrate, the first location corresponding to a first subset of structures and the second location corresponding to a second subset of structures.

11. The method of claim 10, wherein selectively deflecting the series of laser pulses comprises:
    while the processing window is at the first location, selectively deflecting the series of laser pulses among the first subset of structures; and
    while the processing window is at the second location, selectively deflecting the series of laser pulses among the second subset of structures.

12. The method of claim 1, further comprising providing the deflected laser pulses from the first deflector to a second deflector, the first deflector configured to deflect the laser pulses in a first direction and the second deflector configured to deflect the laser pulses in a second direction.

13. The method of claim 12, wherein the first direction is substantially perpendicular to a scanning direction of the processing window moving with respect to the semiconductor substrate.

14. The method of claim 13, wherein the second direction is substantially parallel to the scanning direction.

15. A method for processing structures on or within a semiconductor substrate, the method comprising:
    providing a series of laser pulses to a deflector configured to selectively deflect the laser pulses within a processing window;
    scanning the processing window over the semiconductor substrate, a plurality of structures simultaneously passing through the processing window as the processing window is scanned; and
    as the processing window is scanned over the semiconductor substrate in a first direction, selectively deflecting a first laser pulse to a first structure and a second laser pulse to a second structure within the processing window, the second laser pulse being subsequent to the first laser pulse,
    wherein the second laser pulse is deflected in at least a second direction that is in a reverse direction with respect to the first direction,
    wherein selectively deflecting further comprises deflecting the second laser pulse in a third direction with respect to the semiconductor substrate, and wherein the third direction is perpendicular to the first direction; and
    wherein the second laser pulse is deflected to the second structure within 100 μs after the first laser pulse is deflected to the first structure.

16. The method of claim 15, further comprising selectively deflecting a third laser pulse in the series of laser pulses in the first direction.

17. The method of claim 15, wherein the first structure is not adjacent to the second structure.

* * * * *